(12) United States Patent
Ohuchi et al.

(10) Patent No.: US 8,496,390 B2
(45) Date of Patent: Jul. 30, 2013

(54) COVER UNIT AND MOBILE TERMINAL INCLUDING THE SAME

(75) Inventors: Maki Ohuchi, Tokyo (JP); Yuichi Yamada, Tokyo (JP); Masato Yamaguchi, Kanagawa (JP); Masao Matsumoto, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 424 days.

(21) Appl. No.: 12/964,514

(22) Filed: Dec. 9, 2010

(65) Prior Publication Data

US 2011/0279897 A1 Nov. 17, 2011

Related U.S. Application Data

(60) Provisional application No. 61/334,840, filed on May 14, 2010.

(51) Int. Cl.
| | |
|---|---|
| *G03B 17/00* | (2006.01) |
| *G03B 11/04* | (2006.01) |
| *G02B 23/16* | (2006.01) |
| *H04M 1/00* | (2006.01) |

(52) U.S. Cl.
USPC ...... 396/448; 359/511; 445/575.4; 445/575.8

(58) Field of Classification Search
USPC ........... 359/507, 511; 396/348, 448; 348/373; 361/727; 455/575.4, 575.8; 379/443.12; 220/345.1–345.3
See application file for complete search history.

(56) References Cited

U.S. PATENT DOCUMENTS

| | | | | |
|---|---|---|---|---|
| 6,036,376 | A * | 3/2000 | Owashi et al. | 396/349 |
| 2009/0252487 | A1 * | 10/2009 | Matsumoto | 396/448 |
| 2009/0279884 | A1 * | 11/2009 | Matsumoto | 396/448 |

FOREIGN PATENT DOCUMENTS

| | | |
|---|---|---|
| JP | 2001-309003 | 11/2001 |
| JP | 2005-311989 | 11/2005 |
| JP | 2007-065443 | 3/2007 |

* cited by examiner

*Primary Examiner* — Stephone Allen
*Assistant Examiner* — Kimberly N Kakalec
(74) *Attorney, Agent, or Firm* — Oblon, Spivak, McClelland, Maier & Neustadt, L.L.P.

(57) ABSTRACT

A cover unit includes a first cover that is movable between a cover position and an exposed position. A second cover slidably is movable in a direction perpendicular to its visible surface. A cover moving mechanism moves the second cover, wherein, when the first cover is at the cover position, the second cover is at such a height that the visible surface of the second cover is substantially coplanar with a visible surface of the first cover. When the first cover is moved from the cover position to the exposed position, the second cover is moved to such a height such that the visible surface of the second cover is moved by at least an amount that corresponds with the thickness of the first cover. When the first cover is at the exposed position, the first cover is above the visible surface of the second cover.

21 Claims, 18 Drawing Sheets

COVER UNIT AND MOBILE TERMINAL INCLUDING THE SAME

CROSS REFERENCE TO RELATED APPLICATIONS

This present application claims the benefit of the earlier filing date of U.S. Provisional Patent Application Ser. No. 61/334,840, filed May 14, 2010, the entire contents of which is incorporated herein by reference.

BACKGROUND OF THE INVENTION

1. Field of the Invention

The present invention relates to a cover unit including a slidable cover for protecting an object to be covered, such as a camera lens, and to a mobile terminal including the cover unit.

2. Description of the Related Art

FIGS. 35 to 38 illustrate examples of existing cover mechanisms for preventing damage or breakage of an object to be covered, such as a camera lens, and for preventing entry of dust and particulates into the object to be covered.

FIGS. 35 and 36 illustrate a camera apparatus including a camera body 100 having a substantially rectangular-parallelepiped shape and a cover 101 disposed on a visible surface of the case of the camera body 100. The cover 101 of the camera apparatus is slidable in a direction indicated by an arrow M100 of FIG. 36. When the cover 101 is in a closed position illustrated in FIG. 35, a camera lens 102 is covered with the cover 101 and the camera apparatus is protected. When the cover 101 is in an open position illustrated in FIG. 36, the camera lens 102 is exposed to the outside and the camera apparatus is ready for taking pictures.

FIGS. 37 and 38 illustrate a camera apparatus including a cover 111 that is substantially flush with a visible surface of the case of a camera body 110 when the cover 111 covers a camera lens 112 as illustrated in FIG. 37. The cover 111 of the camera apparatus is slidable in a direction indicated by an arrow M110 of FIG. 38. When the cover 111 is in a closed position illustrated in FIG. 37, the camera lens 112 is covered with the cover 111 and the camera apparatus is protected. On the other hand, when the cover 111 is in an open position illustrated in FIG. 38, the camera lens 112 is exposed to the outside and the camera apparatus is ready for taking pictures.

Japanese Unexamined Patent Application Publication Nos. 2007-65443 (FIG. 2), 2005-311989 (FIG. 3), and 2001-309003 (FIG. 1), for example, disclose other types of cover mechanisms for protecting an object to be covered, such as a camera lens.

Japanese Unexamined Patent Application Publication No. 2007-65443 discloses a lens cover structure including a slider that is a substrate on which a camera cover is mounted and that engages with and slides along a slide groove, a plate spring unit that engages with a recess formed in one of the side surfaces of the slider in a width direction, and a plate spring unit that engages with a recess formed in the other of the side surfaces of the slider.

Japanese Unexamined Patent Application Publication No. 2005-311989 discloses a mobile product including an apparatus body and a slide cover that is movably attached to the apparatus body so as to cover and exposed a functional portion of the apparatus body.

Japanese Unexamined Patent Application Publication No. 2001-309003 discloses a mobile phone apparatus in which a protective cover is provided to a camera in a mobile phone body, a linear protrusion for sliding is provided to a protective cover, and a groove for sliding is provided to the mobile phone body, so that the protective cover can be moved along the groove.

SUMMARY OF THE INVENTION

In the cover mechanism illustrated in FIGS. 35 and 36, the cover 101 protrudes from the visible surface of the case of the camera body 100, which is substantially rectangular-parallelepiped shaped. Therefore, for example, there is a problem in that the cover 101 is easily snagged on the seam of a pocket or the like when the camera apparatus is put in or pulled out of the pocket or the like. If the cover 101 is snagged on the seam of a pocket or the like when the camera apparatus is put in or pulled out of the pocket or the like, the cover 101 may become broken. Moreover, for example, if the camera apparatus is configured so that a camera function is deactivated in the cover closed state illustrated in FIG. 35 and the camera function is automatically activated when the cover 101 is slid from the closed state to an open state illustrated in FIG. 36, the camera function may be unintentionally activated if the cover 101 is opened when the camera apparatus is put in or pulled out of a pocket or the like. Moreover, the design, in which the cover 101 protrudes from the visible surface of the case of the camera body 100, which has a substantially rectangular-parallelepiped shape, is unusual and unattractive.

In the cover mechanism illustrated in FIGS. 37 and 38, the cover 111 is substantially flush with the visible surface of the case of the camera body 110 in the cover closed state, so that it is unlikely that the cover 111 is snagged on the seam of a pocket or the like when the camera apparatus is put in or pulled out of the pocket or the like. However, also with this cover mechanism, the cover 111 protrudes from the visible surface of the case of the camera body 110 in the cover open state, and the cover 111 may be broken for to the same reason as above.

The cover mechanisms disclosed in the Japanese Unexamined Patent Application Publication Nos. 2007-65443, 2005-311989, and 2001-309003 have a similar problem.

Therefore, development of a cover structure with which the cover does not protrude from the visible surface of the case irrespective of whether the cover is open or closed is desired. It is desirable that the cover structure have a simple mechanism, be made up of components that can be easily manufactured and assembled so that the cover structure can be manufactured at low cost, facilitates the quality assurance and the quality maintenance, have a low profile, have a high space utilization, and can reduce the effect on the layout of components in the case of the body.

The present description allows for the realization of a cover structure in which the cover does not protrude from the visible surface of the case irrespective of whether the cover is open or closed. A cover unit may be made up of components that can be easily manufactured and assembled so that the cover structure can be manufactured at low cost, that facilitates the quality assurance and the quality maintenance, that has a low profile and a high space utilization, and that can reduce the effect on the layout of components in the case of the body. The present description also provides for a mobile terminal including the cover unit.

According to an embodiment, there is provided a cover unit including a first cover that is movable between a cover position at which the first cover covers an object to be covered and an exposed position at which the first cover does not cover the object to be covered; a second cover including a visible surface that is substantially parallel to a visible surface of the first cover, the second cover being movable in a height direction that is perpendicular to the visible surface thereof; and a cover moving mechanism that moves the second cover in the height direction in accordance with a motion of the first cover between the cover position and the exposed position. The cover moving mechanism includes a guide that support the first cover so that the first cover is slidable between the cover position and the exposed position, a leg that is disposed on a back surface of the second cover, the back surface being opposite to the visible surface of the second cover, a hole into which the leg can be loosely inserted, and a substantially flat portion that an end of the leg can contact, wherein, when the first cover is at the cover position, the end of the leg contacts the substantially flat portion and the second cover is at such a height that the visible surface of the second cover is substantially flush with the visible surface of the first cover, wherein, when the first cover is moved from the cover position to the exposed position, the leg is loosely inserted into the hole and the second cover is moved to such a height that the visible surface of the second cover is lower than the thickness of the first cover, and wherein, when the first cover is at the exposed position, the first cover is above the visible surface of the second cover.

According to an embodiment, there is provided a mobile terminal including a mobile terminal including a portion to be covered; a cover unit including a first cover that is movable between a cover position at which the first cover covers the portion to be covered and an exposed position at which the first cover does not cover the portion to be covered, a second cover including a visible surface that is substantially parallel to a visible surface of the first cover, the second cover being movable in a height direction that is perpendicular to the visible surface thereof; and a cover moving mechanism that moves the second cover in the height direction in accordance with a motion of the first cover between the cover position and the exposed position, wherein the cover moving mechanism includes a guide that supports the first cover therebetween so that the first cover is slidable between the cover position and the exposed position, a leg that is disposed on a back surface of the second cover, the back surface being opposite to the visible surface of the second cover, a hole into which the leg can be loosely inserted, and a substantially flat portion that an end of the leg can contact, wherein, when the first cover is at the cover position, the end of the leg contacts the substantially flat portion and the second cover is at such a height that the visible surface of the second cover is substantially flush with the visible surface of the first cover, wherein, when the first cover is moved from the cover position to the exposed position, the leg is loosely inserted into the hole and the second cover is moved to such a height that the visible surface of the second cover is lower than the thickness of the first cover, and wherein, when the first cover is at the exposed position, the first cover is above the visible surface of the second cover, and a case that contains the portion to be covered and the cover unit, the case having a visible surface that is substantially flush with the visible surface of the first cover.

According to an embodiment, a mobile communication terminal is described that includes a portion to be covered and a cover unit. The cover unit includes a first cover that is slidably movable in a first direction between a cover position at which the first cover covers an object to be covered and an exposed position at which the first cover does not cover the object to be covered. The cover unit also includes a second cover including a visible surface that is substantially coplanar with a visible surface of the first cover when the first cover is in the closed position, the second cover being movable in a height direction, the height direction being substantially perpendicular to the visible surface of the second cover. The terminal also includes a mechanism for moving the second cover in the height direction in accordance with a substantially lateral motion of the first cover between the cover position and the exposed position, said first cover covering the second cover when the first cover is in the exposed position, the mechanism for moving includes an ability to lower the second cover into a cavity covered by the first cover in response to the first cover being moved to the exposed position, and maintain a fixed overall height of the mobile communication terminal when the first cover is in the cover position and when said first cover is in the exposed position. The terminal also includes a case that contains the portion to be covered and the cover unit, the case having a visible surface that is substantially flush with the visible surface of the first cover.

That is, according to the embodiments of the present invention, when the first cover is at the cover position at which the first cover covers the object to be covered (in the cover closed state), an end of the leg contacts the substantially flat portion, whereby the visible surfaces of the first cover and the second cover are substantially flush with each other. According to embodiments of the present invention, when the first cover is moved to the exposed position at which the first cover does not cover the object to be covered, the leg is loosely inserted into the hole, whereby the visible surface of the second cover is moved to a height smaller than the thickness of the first cover. According to the embodiments of the present invention, when the first cover is at the exposed position (in the cover open state), the first cover is disposed above the visible surface of the second cover, whereby the second cover is disposed below the first cover.

The embodiments of the present invention realize a cover structure in which, when the first cover is at the cover position, the visible surfaces of the first and second covers are substantially flush with each other, and, when the first cover is at the exposed position, the second cover is disposed below the first cover, whereby the cover does not protrude from the visible surface of the case irrespective of whether the cover is in the cover closed state or in the cover open state. The cover structure and the mobile terminal according to the embodiments of the present invention have simple mechanisms, are made up of components that can be easily manufactured and assembled so that the cover structure and the mobile terminal can be manufactured at low cost, facilitate the quality assurance and the quality maintenance, have low profiles, have high space utilization, and can reduce the effect on the layout of components in the case of the body.

BRIEF DESCRIPTION OF THE DRAWINGS

FIGS. 24A to 24C are detailed views of the first cover, in which FIG. 24A illustrates the first cover viewed from the back side opposite to the visible surface, FIG. 24B is a top view of FIG. 24A, and FIG. 24C is a bottom view of FIG. 24A;

DESCRIPTION OF THE PREFERRED EMBODIMENTS

Hereinafter, an embodiment the present invention will be described with reference to the drawings.

The embodiment is a mobile phone terminal including a slidable cover unit that protects a camera lens, which is an object to be covered. The embodiment is an example, and the present invention is not limited thereto.

External View of Case of Mobile Phone Terminal

Figure 1:
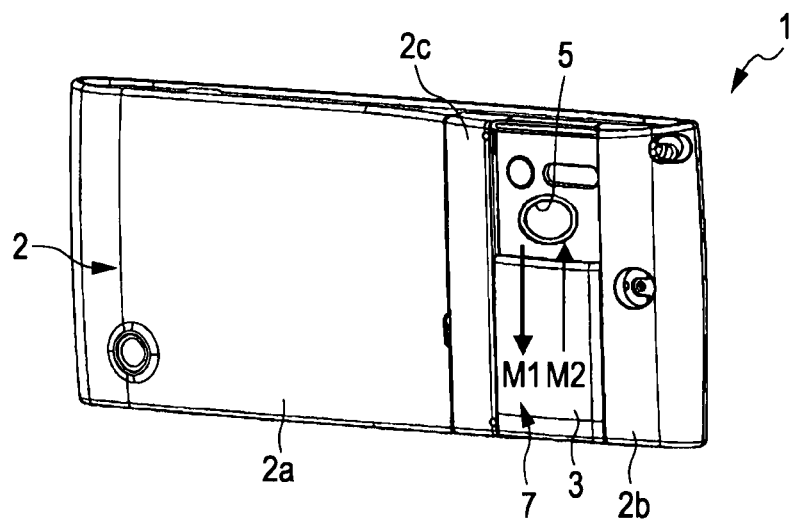
FIG. 1 is a perspective view of a mobile phone terminal including a cover unit according to an embodiment of the present invention, illustrating a cover open state in which a first cover of the cover unit is open.
Figure 2:
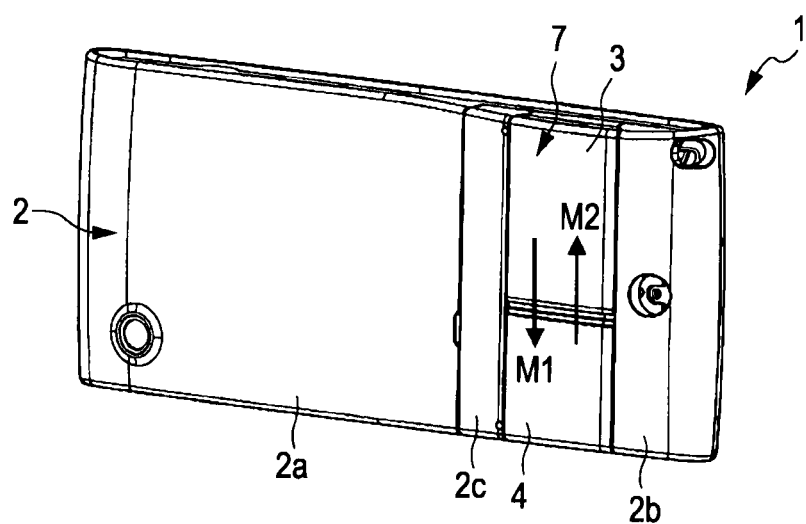
FIG. 2 is a perspective view of the mobile phone terminal including the cover unit according to an embodiment of the present invention, illustrating a cover closed state in which the first cover of the cover unit is closed.

FIGS. 1 and 2 are schematic external views of a mobile phone terminal 1 including a case 2 in which only a cover unit 7 of the embodiment is assembled. FIG. 1 illustrates a cover open state in which a first cover 3 of the cover unit 7 is open. In the cover open state, a lens opening 5, in which a camera lens is disposed, and the like are exposed to the outside. FIG. 2 illustrates a cover closed state in which the first cover 3 of the cover unit 7 is closed. In the cover closed state, the lens opening 5 and the like are covered by the first cover 3.

The cover unit 7 of the embodiment includes the first cover 3 and a second cover 4. The first cover 3 is slidable in a cover opening direction indicated by an arrow M1 and in a cover closing direction indicated by an arrow M2 in FIGS. 1 and 2. In the cover open state illustrated in FIG. 1, the cover unit 7 of the embodiment exposes the camera lens and a flash to the outside, and the mobile phone terminal 1 of the embodiment is ready for taking pictures with the camera. On the other hand, in the cover closed state illustrated in FIG. 2, the cover unit 7 of the embodiment covers the camera lens and the flash with the first cover 3, so that the camera lens and the like are protected. In the embodiment, the mobile phone terminal 1 is waterproof in that the camera lens, the flash, a microphone, a speaker, and a keypad are sealed so as to be waterproof.

In particular, the cover unit 7 of the embodiment is configured so that the visible surfaces of the first cover 3 and the second cover 4 have substantially the same height as (are substantially flush with) the visible surface of the case 2, when the cover unit 7 is in the cover closed state illustrated in FIG. 2. The cover unit 7 of the embodiment is configured so that the visible surface of the second cover 4 is moved downward to a position between the visible surface of the case 2 and the inside of the case 2 and the first cover 3 slides over the second cover 4, when the state of the cover unit 7 is changed from the cover closed state of FIG. 2 to the cover open state of FIG. 1 by sliding the first cover 3 in the direction indicated by the arrow M1. In the cover open state of FIG. 1, the visible surface of the first cover 3 has substantially the same height as (is substantially flush with) the visible surface of the case 2. The cover unit 7 of the embodiment is configured so that the visible surface of the second cover 4 is moved upward to a position that is substantially flush with the visible surface of the case 2, when the state of the cover unit 7 is changed from the cover open state of FIG. 1 to the cover closed state of FIG. 2 by moving the first cover 3 in a direction indicated by the arrow M2. Detailed structure of the cover unit 7 will be described below.

Structure of Case of Mobile Phone Terminal and Assembling of Cover Unit

FIGS. 3 to 8 illustrate an outline structure of the case 2 of the mobile phone terminal 1 and a state in which the cover unit 7 is assembled in the case 2.

As illustrated in FIGS. 1, 2 and 3 to 8, the case 2 of the mobile phone terminal 1 of the embodiment includes a main outer case 2a, an inner case 2d, a first cover-pressing outer case 2b, and a second cover-pressing outer case 2c.

Figure 3:
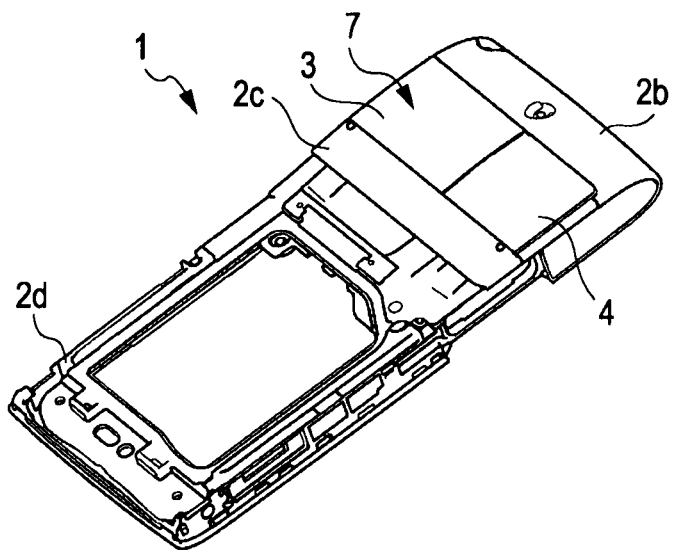
FIG. 3 is an external perspective view of a case of the mobile phone terminal from which a main outer case is removed and in which a cover unit is assembled.
Figure 4:
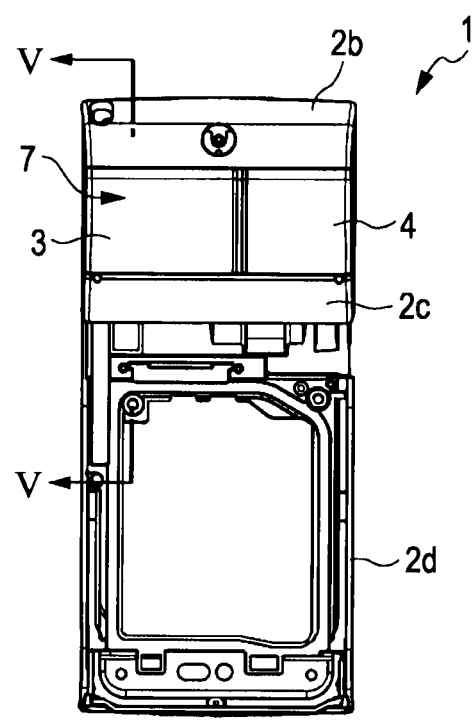
FIG. 4 is an external front view of the case of the mobile phone terminal from which the main outer case is removed and in which the cover unit is assembled.
Figure 5:
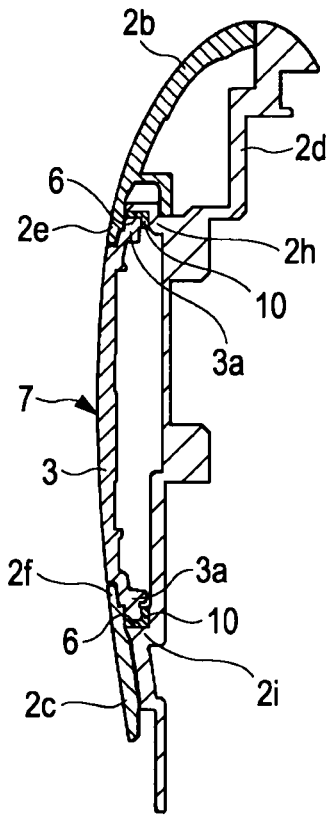
FIG. 5 is an enlarged sectional view of the mobile phone terminal of the embodiment from which the main outer case is removed, taken along line V-V of FIG. 4.
Figure 6:
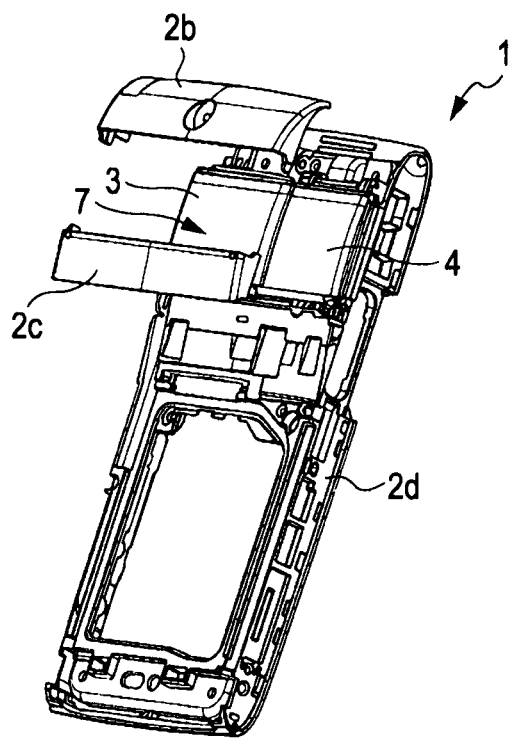
FIG. 6 is an exploded perspective view of the mobile phone terminal of the embodiment from which the main outer case and first and second cover-pressing outer cases are removed.
Figure 7:
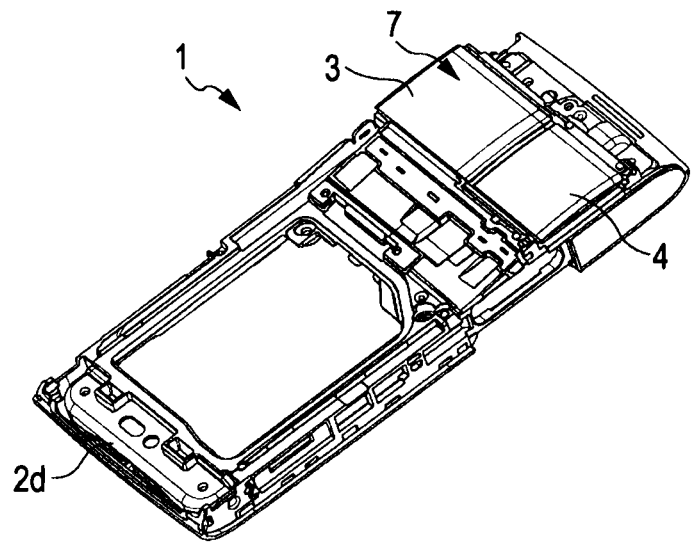
FIG. 7 is an external perspective view of the mobile phone terminal of the embodiment from which the main outer case and the first and second cover-pressing outer cases are removed and in which only the cover unit is assembled in the inner case.
Figure 8:
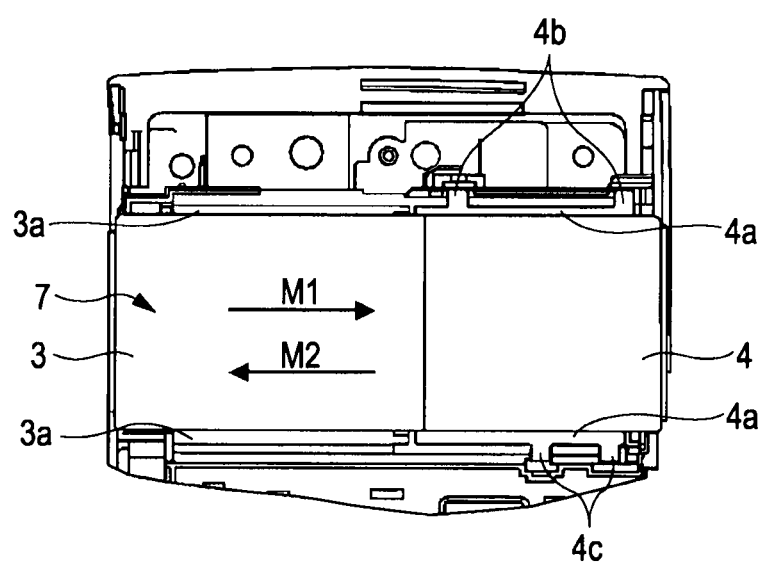
FIG. 8 is an enlarged view of the cover unit and a region surrounding the cover unit.

FIGS. 3 and 4 are external views of the mobile phone terminal 1 of the embodiment from which the main outer case 2a is removed. FIG. 5 is an enlarged sectional view of the mobile phone terminal 1 of the embodiment from which the main outer case 2a is removed, taken along line V-V of FIG. 4. FIG. 6 is an exploded perspective view of the mobile phone terminal 1 of the embodiment from which the main outer case 2a and the first and second cover-pressing outer cases 2b and 2c are removed. FIG. 7 is an external perspective view of the mobile phone terminal 1 of the embodiment from which the main outer case 2a and the first and second cover-pressing outer cases 2b and 2c are removed and in which only the cover unit 7 is assembled in the inner case 2d. FIG. 8 is an enlarged view of FIG. 7, illustrating the cover unit 7 and a region surrounding the cover unit 7.

The main outer case 2a substantially determines the appearance of the mobile phone terminal 1 of the embodiment, and contains the inner case 2d, an internal circuit board, and the like.

The inner case 2d is disposed in the main outer case 2a, and the internal circuit board, the cover unit 7, and other components are attached to the inner case 2d.

The first and second cover-pressing outer cases 2b and 2c hold the first cover 3 and the second cover 4 of the cover unit 7 so as to prevent detachment of the first and second covers 3 and 4. The first cover 3 is supported between the first and second cover-pressing outer cases 2b and 2c so as to be slidable in the directions indicated by the arrows M1 and M2. Each of the first and second cover-pressing outer cases 2b and 2c has claw portions that are fitted into claw receiving portions disposed on the main outer case 2a. The claw portions are fitted into the claw receiving portions of the main outer case 2a, whereby the first and second cover-pressing outer cases 2b and 2c are firmly attached to the main outer case 2a. The first and second cover-pressing outer cases 2b and 2c may be integrally formed with the main outer case 2a.

As illustrated in FIG. 5, in the embodiment, the first cover-pressing outer case 2b has an edge 2e that extends parallel to the directions indicated by the arrows M1 and M2 and that faces a first rail base 2h of the inner case 2d with a predetermined space therebetween, and the second cover-pressing outer case 2c has an edge 2f that extends parallel to the directions indicated by the arrows M1 and M2 and that faces a second rail base 2i of the inner case 2d with a predetermined space therebetween. Two slide rails 6 are formed by the edge 2e of the first cover-pressing outer case 2b and the first rail base 2h of the inner case 2d, and by the edge 2f of the second cover-pressing outer case 2c and the second rail base 2i of the inner case 2d. The first cover 3 has two edges 3a extending parallel to the directions indicated by the arrows M1 and M2, and the edges 3a are slidably fitted into the slide rails 6, whereby the first cover 3 is supported between the slide rails 6 so as to be slidable in the directions indicated by the arrows M1 and M2. In the embodiment, rail members 10, which are made of a material having a low coefficient of friction and a high strength and durability (for example, polyacetal: POM), are provided to the two slide rails 6, and the rail members 10 protect the first cover 3 and the inner case 2d from friction and shock that are caused due to the sliding motion of the first cover 3.

As illustrated in FIG. 8, the second cover 4 has two protrusions 4b, which are disposed on one of edges 4a that are parallel to the directions indicated by the arrows M1 and M2, and two protrusions 4c, which are disposed on the other of the edges 4a. (There are four protrusions in total.) The protrusions 4b and 4c support the second cover 4 so that the second cover 4 is moved downward to a position between the visible surface of the case 2 and the inside of the case 2 and so that the second cover 4 is not moved in the directions indicated by the arrows M1 and M2.

Details of Cover Unit

Figure 9:
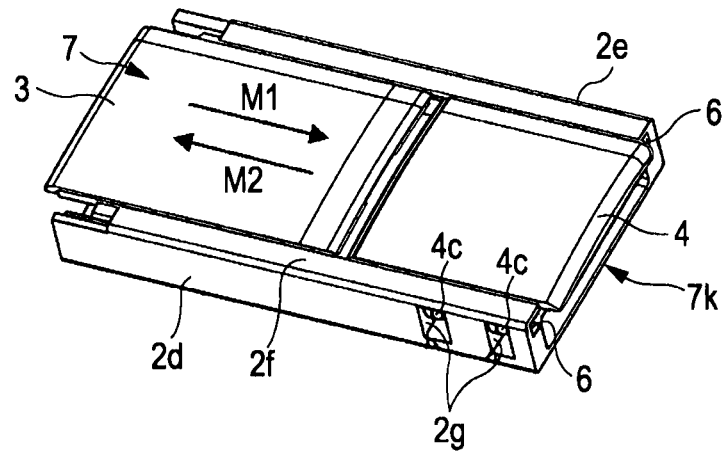
FIG. 9 is a perspective view of the cover unit of the embodiment.
Figure 10:
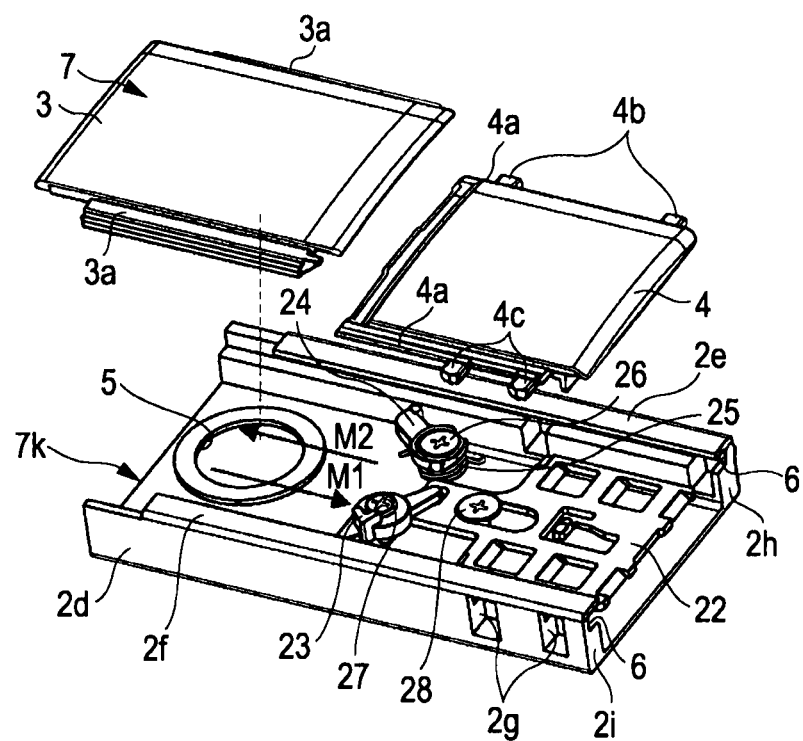
FIG. 10 is an exploded perspective view of the cover unit of the embodiment.

FIG. 9 is a perspective view of the cover unit 7 of the embodiment, and FIG. 10 is an exploded perspective view of the cover unit 7 of the embodiment.

Figure 11:
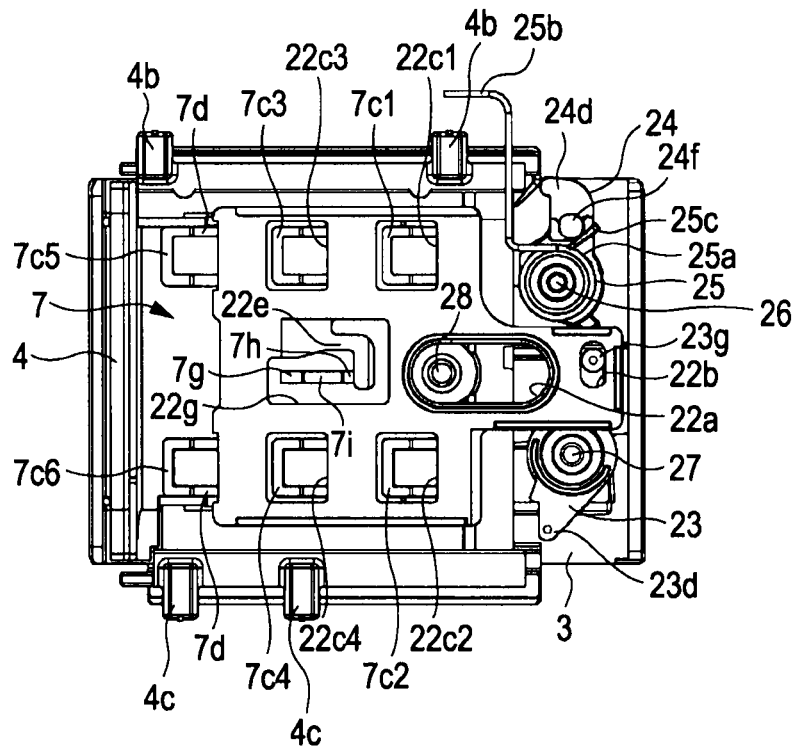
FIG. 11 illustrates the disposition of main components of the cover unit of the embodiment including a base, a second cover, and a first cover when the cover unit of the embodiment is in the cover open state, viewed from the back sides of these components.
Figure 12:
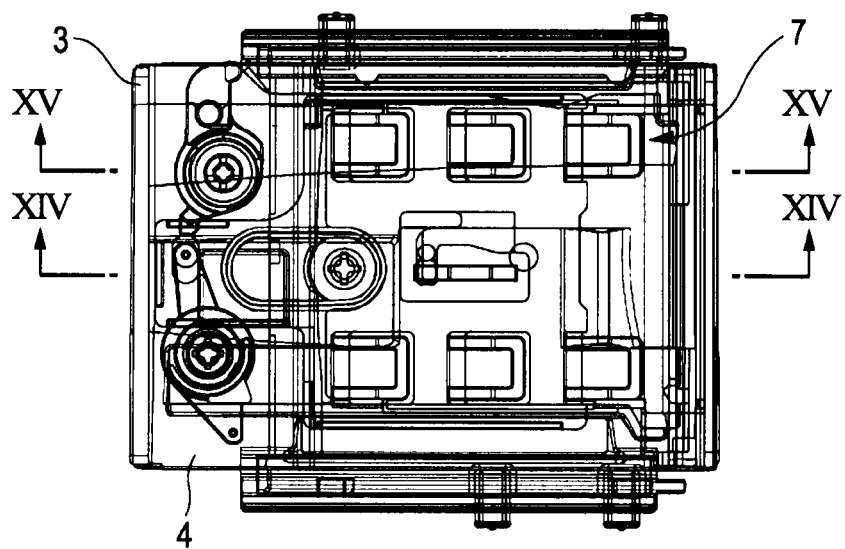
FIG. 12 illustrates the disposition of the first cover, the second cover, the base and other components in the cover open state, seen through the front surfaces (visible surfaces) of these components.
Figure 13:
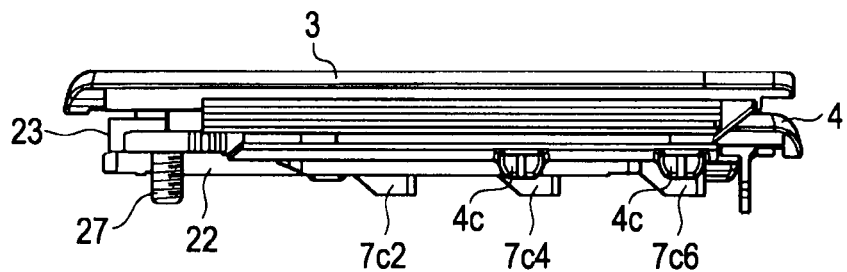
FIG. 13 is an external view of the first cover, the second cover, the base, and other components in the cover open state, viewed from the lateral sides of these components.
Figure 14:
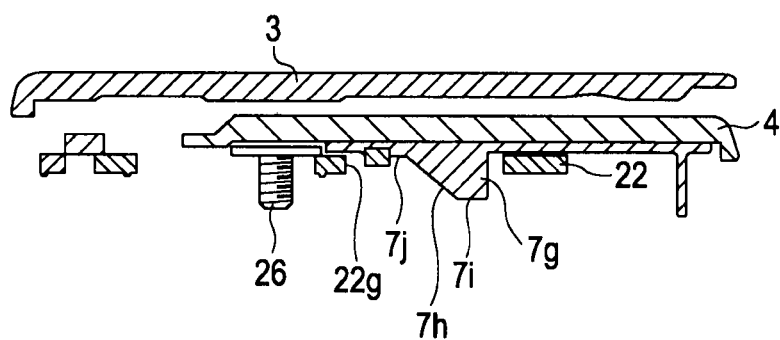
FIG. 14 is a sectional view of the first cover, the second cover, the base, and other components in the cover open state, taken along line XIV-XIV of FIG. 12.
Figure 15:
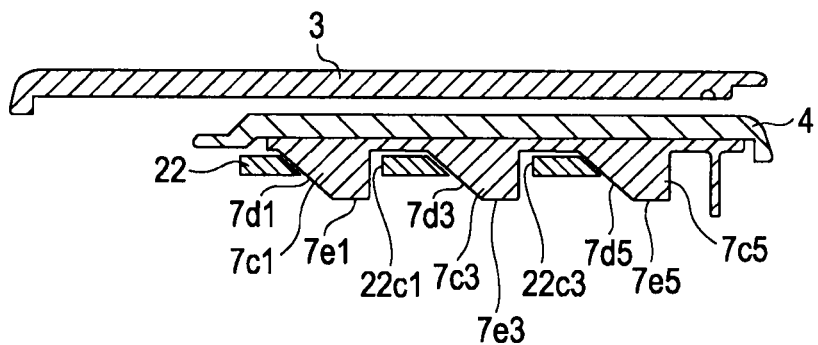
FIG. 15 is a sectional view of the first cover, the second cover, the base, and other components in the cover open state, taken along line XV-XV of FIG. 12.

FIGS. 11 to 15 illustrate the disposition of main components of the cover unit 7 in the cover open state illustrated in FIG. 1. FIG. 11 illustrates the disposition of the main components of the cover unit 7 of the embodiment including a base 22, the second cover 4, and the first cover 3 when the cover unit 7 of the embodiment is in the cover open state, viewed from the back sides of these components. FIG. 12 illustrates the disposition of the first cover 3, the second cover 4, the base 22 and other components in the cover open state, seen through the visible surfaces of these components. FIG. 13 is an external view of the first cover 3, the second cover 4, the base 22, and other components in the cover open state, viewed from the lateral sides of these components. FIG. 14 is a sectional view of the first cover 3, the second cover 4, the base 22, and other components in the cover open state, taken along line XIV-XIV of FIG. 12. FIG. 15 is a sectional view of the first cover 3, the second cover 4, the base 22, and other components in the cover open state, taken along line XV-XV in FIG. 12.

Figure 16:
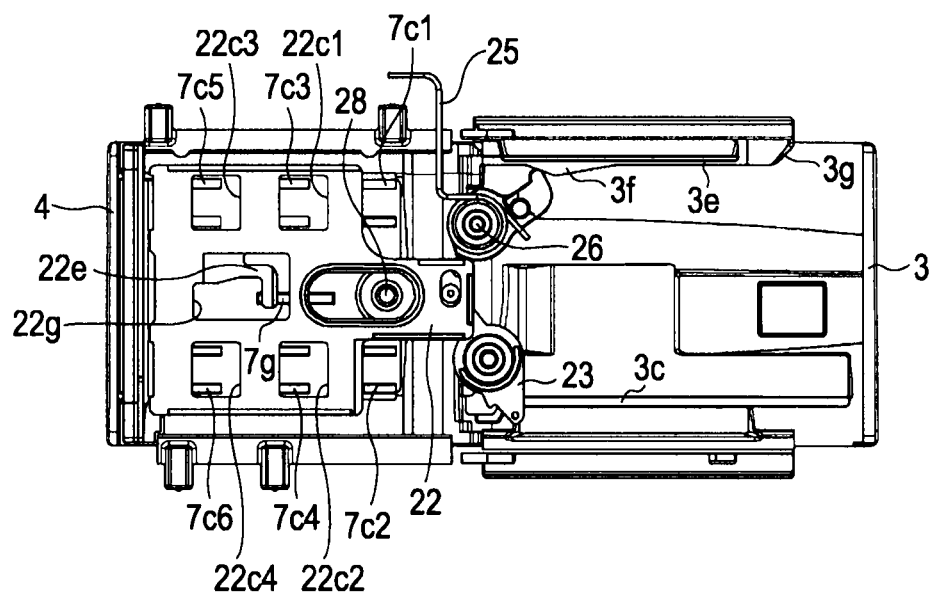
FIG. 16 illustrates the disposition of the main components of the cover unit of the embodiment including the base, the second cover, and the first cover when the cover unit of the embodiment is in the cover open state, viewed from the back sides of these components.
Figure 17:
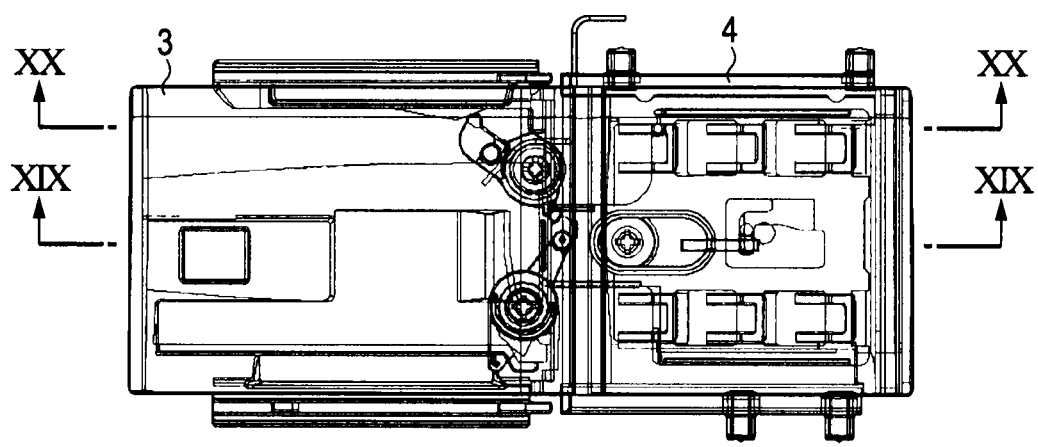
FIG. 17 illustrates the disposition of the first cover, the second cover, the base and other components in the cover open state, seen through the front surfaces (visible surfaces) of these components.
Figure 18:
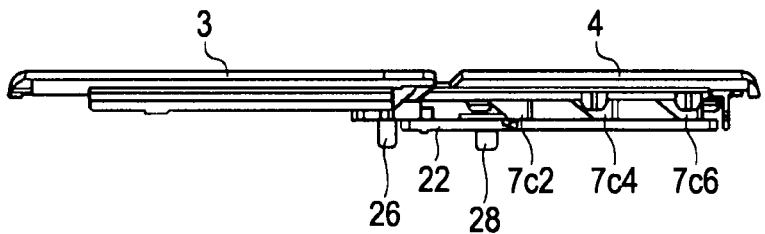
FIG. 18 is an external view of the first cover, the second cover, the base, and other components in the cover open state, viewed from the lateral sides of these components.
Figure 19:
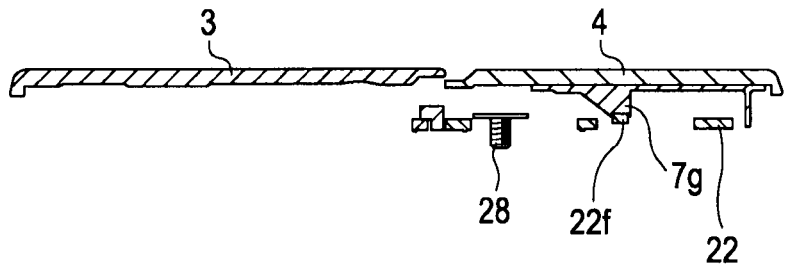
FIG. 19 is a sectional view of the first cover, the second cover, the base, and other components in the cover open state, taken along line XIX-XIX of FIG. 17.
Figure 20:
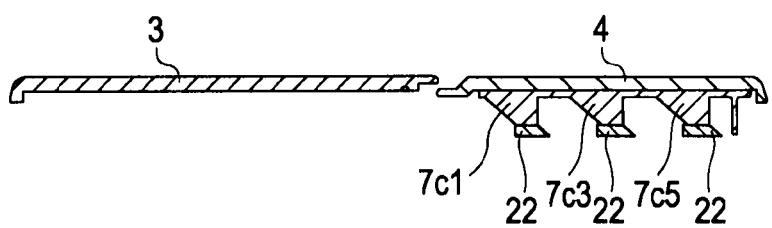
FIG. 20 is a sectional view of the first cover, the second cover, the base, and other components in the cover open state, taken along line XX-XX of FIG. 17.

FIGS. 16 to 20 illustrate the disposition of main components of the cover unit 7 in the cover open state. FIG. 16 illustrates the disposition of the main components of the cover unit 7 of the embodiment including the base 22, the second cover 4, and the first cover 3 when the cover unit 7 of the embodiment is in the cover open state, viewed from the back sides of these components. FIG. 17 illustrates the disposition of the first cover 3, the second cover 4, the base 22 and other components in the cover open state, seen through the front surfaces (visible surfaces) of these components. FIG. 18 is an external view of the first cover 3, the second cover 4, the base 22, and other components in the cover open state, viewed from the lateral sides of these components. FIG. 19 is a sectional view of the first cover 3, the second cover 4, the base 22, and other components in the cover open state, taken along line XIX-XIX of FIG. 17. FIG. 20 is a sectional view of the first cover 3, the second cover 4, the base 22, and other components in the cover open state, taken along line XX-XX of FIG. 17.

As illustrated in FIGS. 9 to 20, the cover unit 7 of the embodiment includes the first cover 3, the second cover 4, the slide rails 6, the base 22, a first lever 23, a second lever 24, a coil spring 25, and screws 26, 27, and 28.

The base 22, the first lever 23, the second lever 24, the coil spring 25, and the screws 26 to 28 are disposed in a space formed by the inner case 2d including the first rail base 2h and the second rail base 2i. The first cover 3 is disposed at a position at which the first cover 3 covers the base 22 and the like so that the first cover 3 can slide in the directions indicated by the arrows M1 and M2 of FIG. 10. The second cover 4 is disposed above the base 22.

In the following description, a portion of the inner case 2d including the first and second rail bases 2h and 2i and surrounding the space that contains the base 22 and other components will be referred to as a unit case 7k. In the above example, the unit case 7k is a portion of the inner case 2d. However, the unit case 7k may be an independent member including the slide rails 6 and capable of containing the base 22 and the like. In this case, the cover unit 7 of the embodiment may be a module including the unit case 7k and the base 22 and the like that are contained in the unit case 7k.

As described above, the second cover 4 has the two protrusions 4b disposed on one of the edges 4a extending parallel to the directions indicated by the arrows M1 and M2 and the two protrusions 4c disposed on the other of the edges 4a (there are four protrusions in total). The unit case 7k has two holes 2k, into which the protrusions 4b are loosely inserted when the second cover 4 is attached to the unit case 7k, and two holes 2g into which the protrusions 4c are loosely inserted when the second cover 4 is attached to the unit case 7k. When the second cover 4 is attached to the unit case 7k, the protrusions 4b, the holes 2k, the protrusions 4c, and the holes 2g support the second cover 4 so that the second cover 4 is movable in directions perpendicular to the visible surface of the second cover 4 and so that the second cover 4 is not moved in the directions indicated by the arrows M1 and M2.

Figure 21:
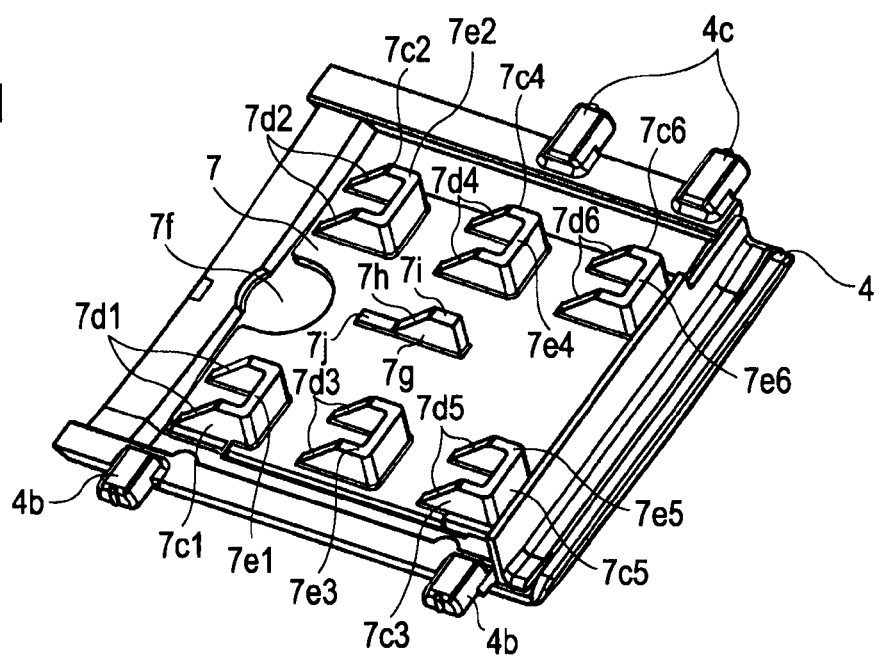
FIG. 21 is a perspective view of the second cover viewed from the back side that faces an inner bottom surface of the unit case when the second cover is attached to the unit case.

As illustrated in FIGS. 11, 15, 16, and 21, the second cover 4 includes six legs 7c1 to 7c6 and a leg 7g on a surface thereof that faces the unit case 7k when the second cover is attached to the unit case 7k. FIG. 21 is a perspective view of the second cover 4 viewed from the back side that faces an inner bottom surface of the unit case 7k when the second cover 4 is attached to the unit case 7k.

The six legs 7c1 to 7c6 respectively include flat leg surfaces 7e1 to 7e6, at which the legs 7c1 to 7c6 can contact the principal surface of the base 22 described below, and inclined leg portions 7d1 to 7d6 that are inclined in the same direction at a desired angle with respect to the flat leg surfaces 7e1 to 7e6.

The leg 7g includes a flat leg surface 7i, at which an end of the leg 7g can contact a protrusion 22f formed on an arm 22e of the base 22, an inclined leg portion 7h, which is inclined with respect to the flat leg surface 7i at an angle that is substantially the same as the angle at which the six legs 7c1 to 7c6 are inclined with respect to the inclined leg portions 7d1 to 7d6, and a flat base portion 7j, which extends from a position near to the bottom of the inclined leg portion 7h.

Moreover, the second cover 4 includes a collision avoidance portion 7f formed in a surface thereof that faces the unit case 7k when the second cover 4 is attached to the unit case 7k. The collision avoidance portion 7f prevents the second cover 4 from colliding with the head of a screw 28 when the second cover 4 is moved downward to a position between the visible surface of the case 2 and the inside of the case 2.

The second cover 4 constitutes a part of the visible surface of the mobile phone terminal 1 of the embodiment. Therefore, the visible surface of the second cover 4 is made of a material that allows flexibility in design and variety in color, or may be made of an independent member. The legs 7c1 to 7c6 and the leg 7g slidingly contact the base 22 as described below. Therefore, the legs 7c1 to 7c6 and 7g are made of a material having, for example, a lower coefficient of friction and a higher strength and durability than that of the visible surface of the second cover 4 (for example, polyacetal or the like).

As illustrated in FIG. 10, the base 22 is attached to the inner bottom surface of the unit case 7k with the screw 28 that is loosely inserted through a hole 22a having a long axis extending parallel to the directions indicated by the arrows M1 and M2 so that the base 22 is slidable in the directions indicted by the arrows M1 and M2. The base 22 has a hole 22b having an oval shape. An engagement protrusion 23g of a lever arm 23e of the first lever 23 described below is loosely inserted through the hole 22b, whereby the base 22 is connected to the lever arm 23e.

Figure 22:
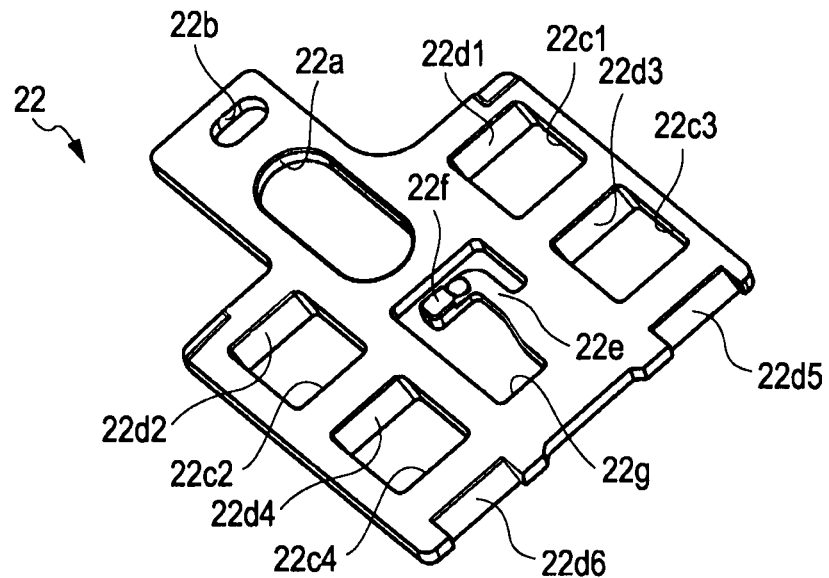
FIG. 22 is a perspective view of the base, viewed from a front side of the base that faces the second cover when the base is attached to the unit case.
Figure 23:
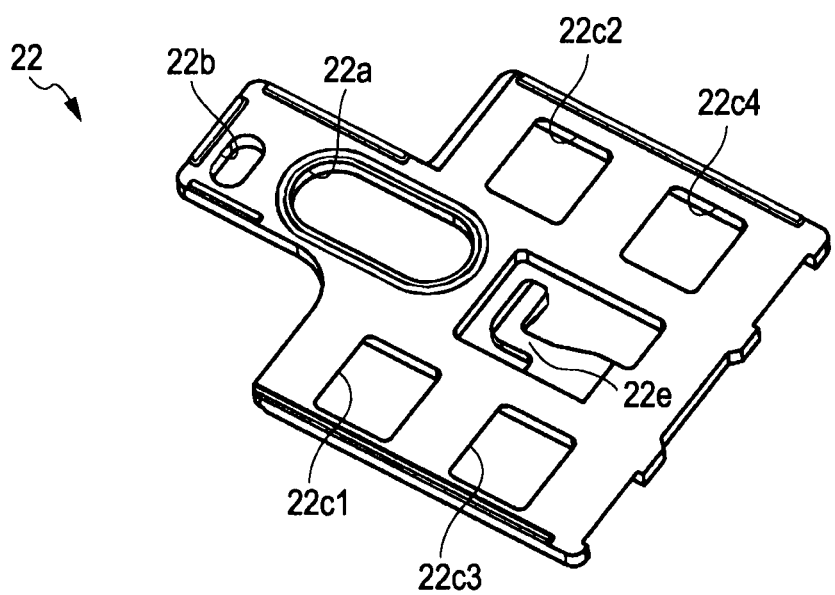
FIG. 23 is a perspective view of the base, viewed from a back side of the base that faces the inner bottom surface of the unit case when the base is attached to the unit case.

As illustrated in FIGS. 11, 16, 22, and 23, the base 22 has, for example, four holes 22c1 to 22c4 and six inclined hole portions 22d1 to 22d6 that are inclined in the same direction. FIG. 22 is a perspective view of the base 22, viewed from a front side of the base 22 that faces the second cover 4 when the base 22 is attached to the unit case 7k. FIG. 23 is a perspective view of the base 22, viewed from a back side of the base 22 that faces the inner bottom surface of the unit case 7k when the base 22 is attached to the unit case.

In the embodiment, the four holes 22c1 to 22c4 and six inclined hole portions 22d1 to 22d6 of the base 22 face the six legs 7c1 to 7c6 of the second cover 4 when the second cover 4 is attached to the unit case 7k. That is, the hole 22c1 faces the leg 7c1 and has a size that allows the leg 7c1 to be loosely inserted therethrough, the hole 22c2 faces the leg 7c2 and has a size that allows the leg 7c2 to be loosely inserted therethrough, the hole 22c3 faces the leg 7c3 and has a size that allows the leg 7c3 to be loosely inserted therethrough, and the hole 22c4 faces the leg 7c4 and has a size that allows the leg 7c4 to be loosely inserted therethrough. The inclined hole portion 22d1 faces and slidingly contacts the inclined leg portion 7d1 of the second cover 4, the inclined hole portion 22d2 faces and slidingly contacts the inclined leg portion 7d2, the inclined hole portion 22d3 faces and slidingly contacts the inclined leg portion 7d3, the inclined hole portion 22d4 faces and slidingly contacts the inclined leg portion 7d4, the inclined hole portion 22d5 faces and slidingly contacts the inclined leg portion 7d5, and the inclined hole portion 22d6 faces and slidingly contacts the inclined leg portion 7d6. In the examples illustrated in FIGS. 22 and 23, the base 22 does not have holes corresponding to the legs 7c5 and 7c6 of the second cover 4. However, the base 22 may have holes corresponding to the legs 7c5 and 7c6.

In the embodiment, in the cover closed state, the flat leg surfaces 7e1 to 7e6 of the second cover 4 contact the principal surface of the base 22, which is a surface that faces the second cover 4 when the base 22 is attached to the unit case 7k. In the embodiment, the height at which the unit case 7k is disposed in the case, the height at which the principal surface of the base 22 is disposed in the unit case k7, and the height of the legs 7c1 to 7c6 of the second cover 4 are determined so that the visible surface of the second cover 4 is at substantially the same height as (is flush with) the visible surface of the case 2 when the flat leg surfaces 7e1 to 7e6 of the second cover 4 contact the principal surface of the base 22. In the embodiment, the unit case 7k is designed so that, when the legs 7c1 to 7c4 of the second cover 4 have been loosely inserted into the holes 22c1 to 22c4 in the base 22, the visible surface of the second cover 4 is moved downward to a position between the visible surface of the case 2 and the inside of the case 2, whereby the second cover 4 is prevented from colliding with the first cover 3 when the first cover 3 is slid in the direction indicated by the arrow M1.

In the embodiment, when the base 22 is moved in a direction indicated by the arrow M1 or M2 in a state in which the inclined hole portions 22d1 to 22d6 of the base 22 slidingly contact the inclined leg portions 7d1 to 7d6 of the second cover 4, the second cover 4 is moved in a direction substantially perpendicular to the visible surface of the second cover 4. That is, when the base 22 is moved in the direction indicated by the arrow M1 in a state in which the inclined hole portions 22d1 to 22d6 of the base 22 slidingly contact the inclined leg portions 7d1 to 7d6 of the second cover 4, the second cover 4 is moved downward in a direction that is substantially perpendicular to the visible surface of the second cover 4 (toward the inside of the case 2). On the other hand, when the base 22 is moved in the direction indicated by the arrow M2 in a state in which the inclined hole portions 22d1 to 22d6 of the base 22 slidingly contact the inclined leg portions 7d1 to 7d6 of the second cover 4, the second cover 4 is moved upward in a direction that is substantially perpendicular to the visible surface of the second cover 4 (toward the outside of the case 2).

The base 22 includes the arm 22e, for example, at the center of the principal surface thereof. The arm 22e has the protrusion 22f, which protrudes by the desired height, near to an end thereof. The arm 22e, which has a predetermined thickness relative to the base 22, is elastic. In the embodiment, the arm 22e and the protrusion 22f at the end of the arm 22e support the second cover 4 from the back side, when the second cover 4 is attached to the unit case 7k and the flat leg surface 7i of the leg 7g of the second cover 4 is in contact with the protrusion 22f of the base 22. Likewise, in the embodiment, the arm 22e and the protrusion 22f at the end of the arm 22e support the second cover 4 from the back side, when the second cover 4 is attached to the unit case 7k and the inclined leg portion 7h and the protrusion 22f slidingly contact with each other. Likewise, in the embodiment, the arm 22e and the protrusion 22f at the end of the arm 22e support the second cover 4 from the back side, when the second cover 4 is attached to the unit case 7k and the flat base portion 7j is in contact with the protrusion 22f. That is, in any of the states described above, the arm 22e and the protrusion 22f at the end of the arm 22e pushes up the second cover 4 in a direction perpendicular to the visible surface (toward the outside of the case 2).

The arm 22e and the protrusion 22f serve to prevent the second cover 4 from wobbling. To be more specific, the arm 22e and the protrusion 22f are provided in order to prevent the second cover 4 from wobbling due to a vibration when, for example, a sound comes out of a speaker of the mobile phone terminal 1 of the embodiment, a vibrator vibrates, or a vibration is applied to the mobile phone terminal 1 from the outside.

In the embodiment, a hole 22g is formed adjacent to the arm 22e. The leg 7g is loosely inserted into the hole 22g when, for example, the legs 7c1 to 7c4 of the second cover 4 have been loosely inserted into the holes 22c1 to 22c4 in the base 22. The leg 7g has the inclined leg portion 7h. The inclined leg portion 7h slidingly contacts the protrusion 22f when the inclined hole portions 22d1 to 22d6 of the base 22 sliding contact the inclined leg portions 7d1 to 7d6 of the second cover 4.

Figure 24B:
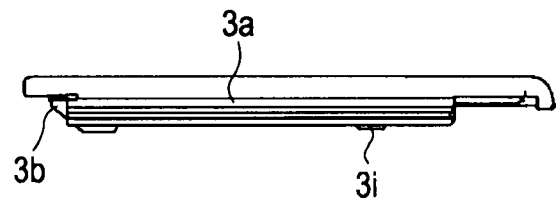
Figure 24A:
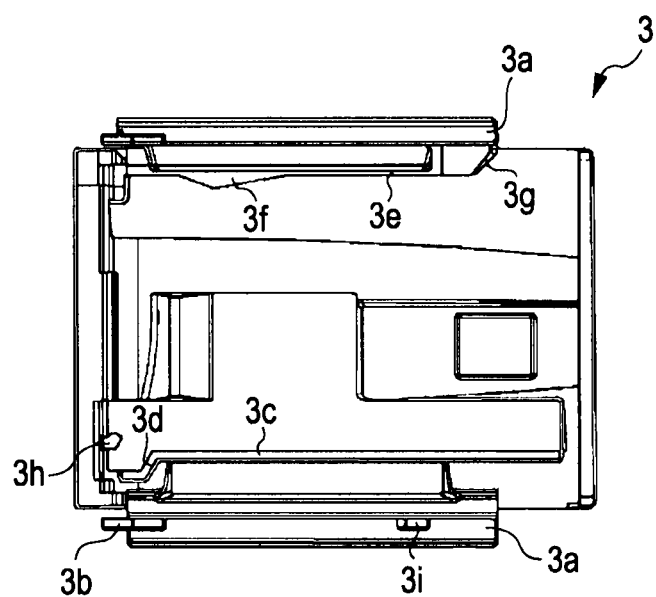
Figure 24C:
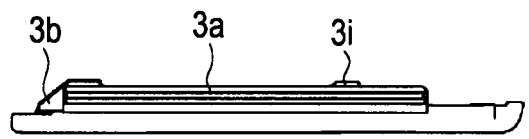
Figure 25:
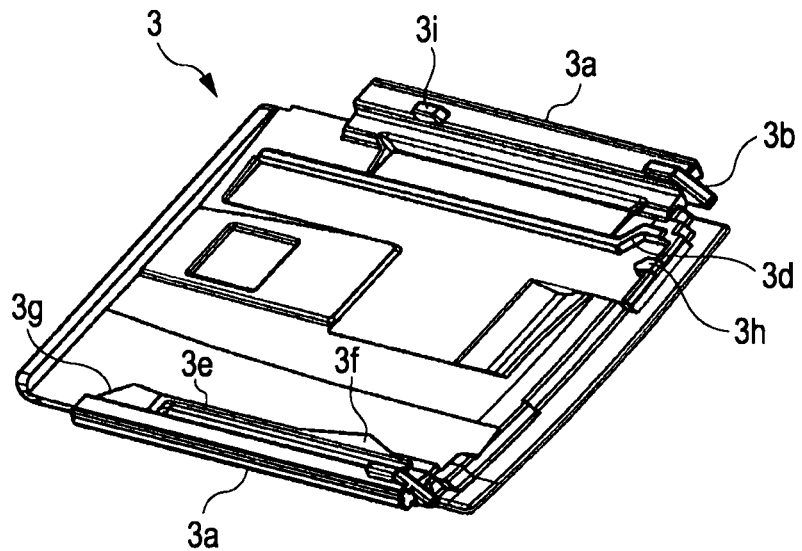
FIG. 25 is a detailed perspective view of the first cover, viewed from the back side of the first cover.

FIGS. 24A to 25 are detailed views of the first cover 3. FIGS. 24A to 24C are detailed views of the first cover 3, in which FIG. 24A illustrates the first cover 3 viewed from the back side opposite to the visible surface (from a side that faces the inside of the case when the first cover 3 is assembled in the unit case 7k), FIG. 24B is a top view of FIG. 24A, and FIG. 24C is a bottom view of FIG. 24A. FIG. 25 is a perspective view of the first cover 3, viewed from the back side.

As illustrated in FIGS. 24A to 25, the first cover 3 includes the edges 3a, which are slidably fitted into the slide rails 6 when the first cover is assembled in the unit case 7k. The edges 3a include first guides 3b disposed on ends thereof that are located adjacent to the second cover 4 when the first cover 3 is assembled in the unit case 7k. The first guides 3b include inclined surfaces having a predetermined inclination angle and flat surfaces extending substantially parallel to the edges 3a.

One of the edges 3a further includes a second guide 3i. The second guide 3i and the flat surfaces of the first guides 3b serve to maintain a state in which the second cover 4 is pressed downward in a direction perpendicular to the visible surface of the second cover 4 (toward the inside of the unit case 7k) in the cover open state. That is, for example, in the cover open state, the second cover 4 is sandwiched between the second guide 3i and the flat surfaces of the first guides 3b from above and the arm 22e of the base 22 and the protrusion 22f from below, whereby the height of the visible surface of the first cover 3 is maintained at the same height as the visible surface of the case 2. Moreover, as described above, the second guide 3i, the flat surfaces of the first guides 3b, the arm 22e of the base 22, and the protrusion 22f prevent the second cover 4 from vibrating due to vibration of the speaker and the vibrator and a vibration or the like that is applied from the outside.

The first cover 3 has a first guide rail 3c, a stopper 3h, and a second guide rail 3e on the back side thereof. The first guide rail 3c is disposed near to one of the edges 3a, and the second guide rail 3e is disposed near to the other of the edges 3a.

The first guide rail 3c has a boss guide 3d on an end thereof that is located adjacent to the second cover 4 when the first cover 3 is assembled in the unit case 7k. The stopper 3h is disposed near to the boss guide 3d of the first guide rail 3c.

As will be described below, the first guide rail 3c and the stopper 3h guide the base 22 in corporation with the first lever 23, so that the base 22 can move in the directions indicated by the arrows M1 and M2 and thereby the second cover 4 can move upward and downward in the directions perpendicular to the visible surface of the second cover 4.

Figure 26:
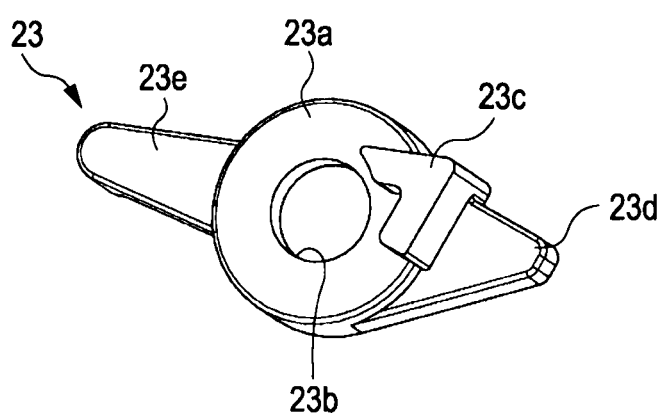
FIG. 26 is a perspective view of the first lever viewed from a side thereof that faces the first and second covers when the first lever is assembled in the unit case.
Figure 27:
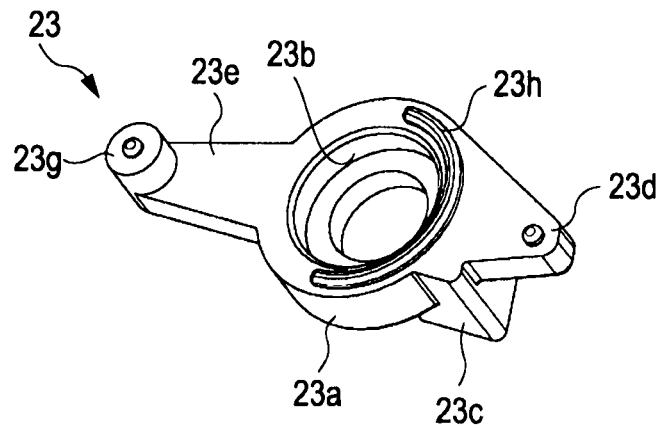
FIG. 27 is a perspective view of the first lever viewed from a side thereof that faces the base when the first lever is assembled in the unit case.
Figure 28:
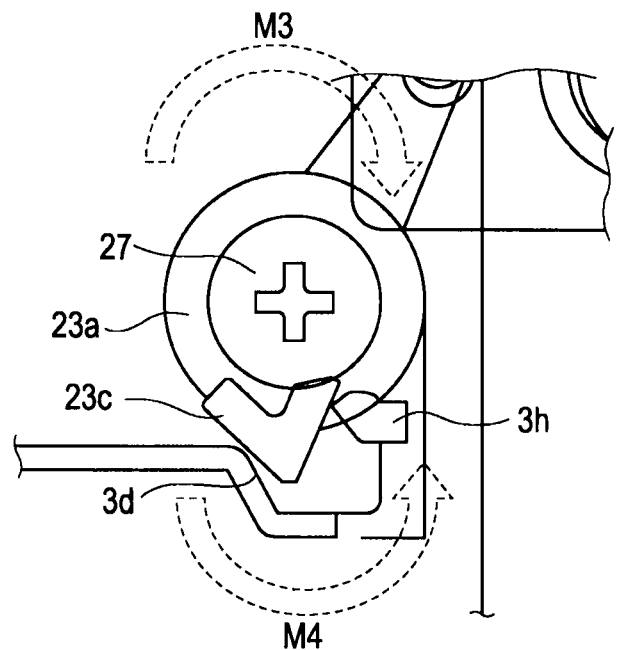
FIG. 28 is an enlarged view of a region surrounding the first lever when the first cover, the first lever, and the like are assembled in the unit case, illustrating the relationship among the first lever, the first guide rail, and the first boss in the cover closed state.
Figure 29:
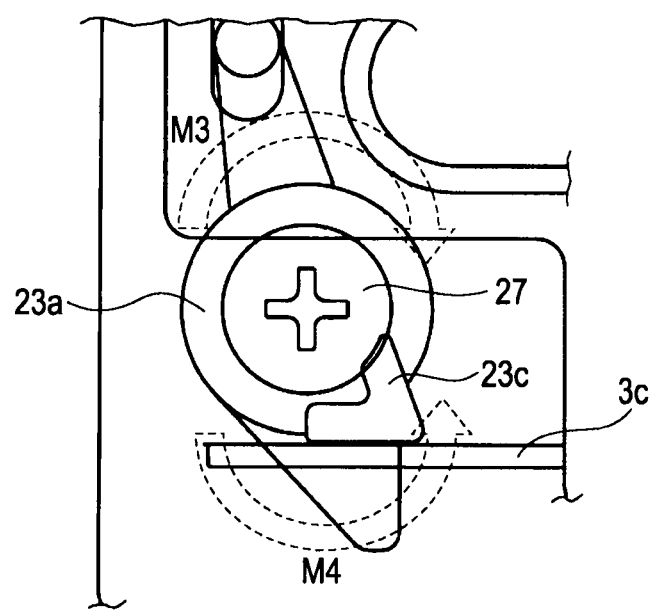
FIG. 29 is an enlarged view of a region surrounding the first lever when the first cover, the first lever, and the like are assembled in the unit case, illustrating the relationship between the first lever and the first guide rail in the cover open state.
Figure 30:
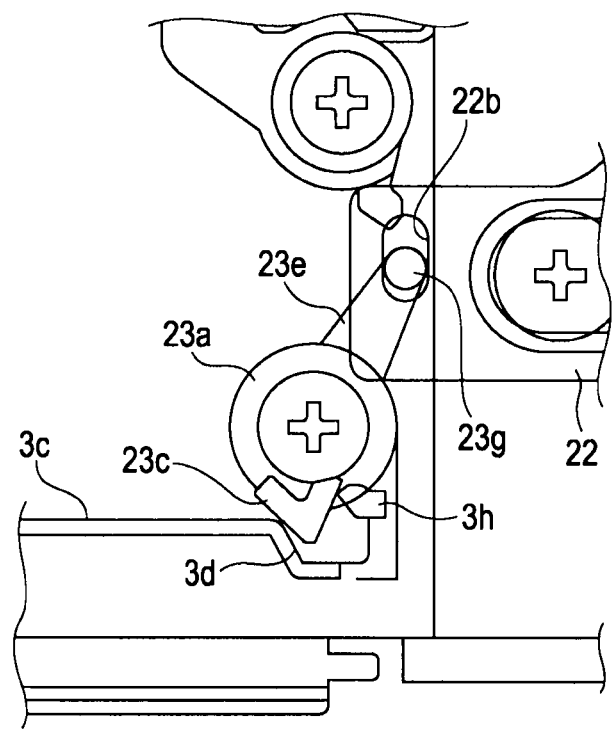
FIG. 30 is an enlarged view of a region surrounding the first lever when the first cover, the first lever, and the like are assembled in the unit case, illustrating the relationship between the time at which the first cover starts sliding and the time at which the base starts moving.

FIGS. 26 and 27 are enlarged views of the first lever 23. FIG. 26 is a perspective view of the first lever 23 viewed from a side thereof that faces the first and second covers 3 and 4 when the first lever 23 is assembled in the unit case 7k. FIG. 27 is a perspective view of the first lever 23 viewed from a side thereof that faces the base 22 when the first lever 23 is assembled in the unit case 7k. FIGS. 28 to 30 are enlarged see-through views of a region surrounding the first lever 23 when the first cover 3, the first lever 23, and the like are assembled in the unit case 7k.

As illustrated in FIG. 10, the first lever 23 is attached to the inner bottom surface of the unit case 7k so as to be rotatable around the axis of the screw 27.

As illustrated in FIGS. 10, 26, and 27, the first lever 23 includes the lever arm 23e, a first boss 23c, and a second boss 23d that are integrally formed on the cylindrical surface of a lever base 23a. The screw 27 is loosely inserted into a screw hole 23b in the lever base 23a. That is, the first lever 23 is attached to the inner bottom surface of the unit case 7k so that the lever base 23a can rotate around the axis of the screw 27. The engagement protrusion 23g is disposed on an end portion of the lever arm 23e of the first lever 23, and the engagement protrusion 23g is loosely inserted into the hole 22b in the base 22. Therefore, when the lever base 23a of the first lever 23 rotates around the axis of the screw 27, the lever arm 23e also rotates around the axis of the screw 27 in accordance with the rotation of the lever base 23a. At this time, the rotational motion of the lever arm 23e is transferred to the base 22 through the hole 22b, into which the engagement protrusion 23g at the end of the lever arm 23e is loosely inserted, so that the rotational motion is converted to a linear motion of the base 22 in the directions indicated by the arrows M1 and M2. That is, the oval shape of the hole 22b serves to convert the rotational motion of the lever arm 23e to the linear motion of the base 22. When the first lever 23 rotates as described above, the second boss 23d of the first lever 23 slidingly contacts the flat surface of the first guide rail 3c of the first cover 3. When the first lever 23 rotates as described above, a semiarc-shaped protrusion 23h of the first lever 23 slidingly contacts a flat surface formed on the inner bottom side of the unit case 7k, whereby the lever arm 23e is prevented from wobbling in the axial direction of the screw 27.

In a state in which the first lever 23 and the first cover 3 are assembled in the unit case 7k, the first boss 23c of the first lever 23 slidingly contacts the first guide rail 3c when the first cover 3 is slid, and is stopped by the stopper 3h when the first cover 23 is in the cover closed state. In other words, when the first cover 3 is assembled in the unit case 7k and the first cover 3 is slid in the directions indicated by the arrows M1 and M2, the first guide rail 3c, the boss guide 3d, and the stopper 3h slidingly contact the first boss 23c the first lever 23 or is stopped by the stopper 3h, so that the first lever 23 can perform a predetermined motion. In the embodiment, the predetermined motion of the first lever 23 is a rotational motion around the axis of the screw 27, which is converted to a translational motion of the base 22 in the direction indicated by the arrows M1 or M2.

As illustrated in FIG. 28, when the first cover 3 is in the cover closed state, the stopper 3h and the boss guide 3d contact the first boss 23c of the first lever 23, thereby limiting the rotation of the first lever 23 in the directions indicated by arrows M3 and M4. That is, in the embodiment, when the first cover 3 is in the cover closed state, the first boss 23c of the first lever 23 contacts the stopper 3h and the boss guide 3d, so that the first lever 23 is not accidentally rotated.

As illustrated in FIG. 29, when the first cover 3 is in the cover open state, the first guide rail 3c surface-contacts the first boss 23c of the first lever 23, thereby limiting the rotation of the first lever 23 in the directions indicated by the arrows M3 and M4. That is, in the embodiment, when the first cover 3 is in the cover open state, the first boss 23c of the first cover 23 continuously surface-contacts the first guide rail 3c, so that the first lever 23 is not accidentally rotated.

As illustrated in FIG. 30, in the embodiment, by appropriately determining the position at which the first boss 23c is disposed on the first lever 23 and the position at which the hole 22b, through which the engagement protrusion 23g is loosely inserted, is formed in the base 22, the time interval between the time at which the first cover 3 is slid in the direction indicated by the arrow M1 from the cover closed state and the time at which the base 22 is moved in the direction indicated by the arrow M1 can be adjusted to a desired time interval. That is, as illustrated in FIG. 30, by desirably determining the ratio of the distance between the position at which the first lever 23 starts rotating and the position at which the first boss 23c contacts the boss guide 3d and the distance between the position at which the first lever 23 starts rotating and the hole 22b in the base 22 through which the engagement protrusion 23g of the first lever 23 is loosely inserted, the distance by which the first cover 3 moves between the time at which the first cover 3 starts sliding and the time at which the second cover 4 is moved downward in a direction perpendicular to the second cover 4 can be adjusted to a desired distance. Likewise, by changing the position of the boss guide 3d on the first guide rail 3c, the time interval between the time at which the first cover 3 starts sliding and the time at which the second cover 4 is moved downward in a direction perpendicular to the second cover 4 can be adjusted to a desired time interval. When the time interval is reduced, the gap between the first cover 3 and the second cover 4 is reduced.

Referring back to FIGS. 24A to 25, the second guide rail 3e includes a first lever guide 3f disposed near to one of the ends thereof that is located adjacent to the second cover 4 when the first cover 3 is assembled in the unit case 7k and a second lever guide 3g disposed near to the other of the ends.

In corporation with the second lever 24 and the coil spring 25 described below, the second guide rail 3e and the first and second lever guides 3f and 3g serve to provide a predetermined tactile feel to a user's finger or the like when the user is sliding the first cover 3, and also serve to temporarily hold (lock) the cover closed state or the cover open state, when the first cover 3 is assembled in the unit case 7k and the first cover 3 is slid in the direction indicated by the arrows M1 and M2.

Figure 31:
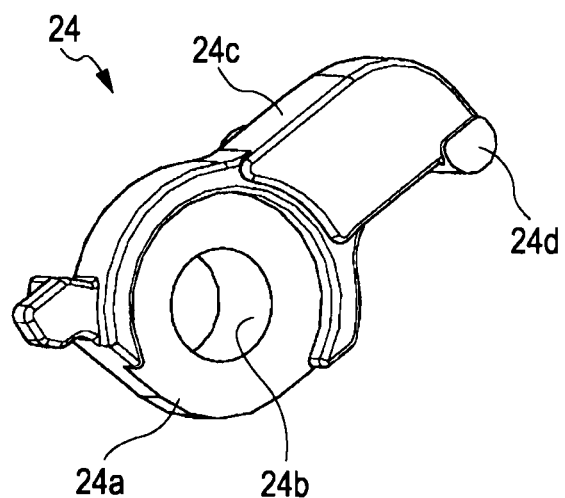
FIG. 31 is an enlarged perspective view of the second lever, viewed from a side thereof that faces the first and second covers when the second lever is assembled in a unit case.
Figure 32:
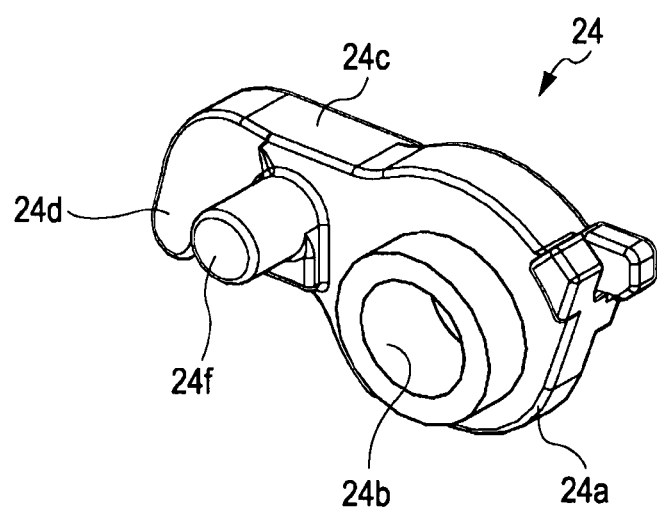
FIG. 32 is an enlarged perspective view of the second lever, viewed from a side thereof that faces the inner bottom surface of the unit case when the second lever is assembled in the unit case.
Figure 33:
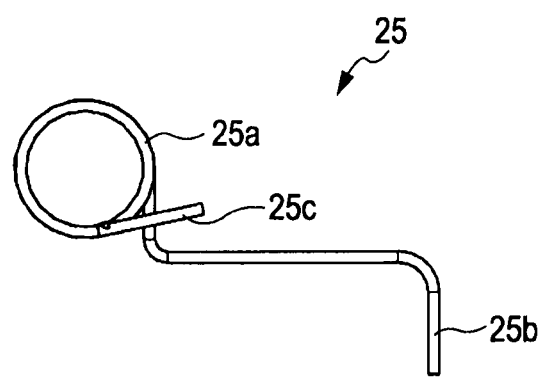
FIG. 33 is a front view of a wound portion of a coil spring.
Figure 34:
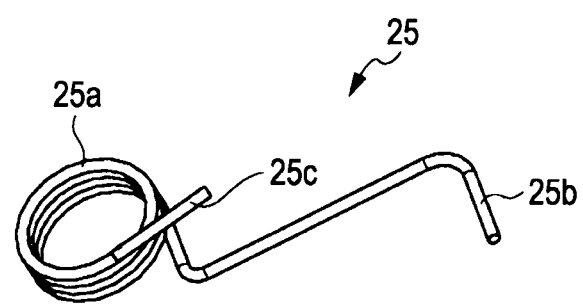
FIG. 34 is a perspective view of the coil spring.
Figure 35:
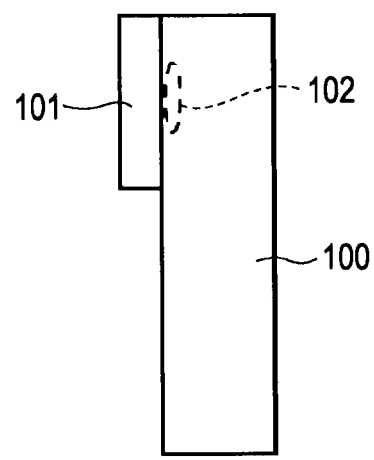
FIG. 35 is a schematic view of an existing camera including a cover that is disposed on a visible surface of a case that is substantially rectangular-parallelepiped shaped when the cover is in a closed position.
Figure 36:
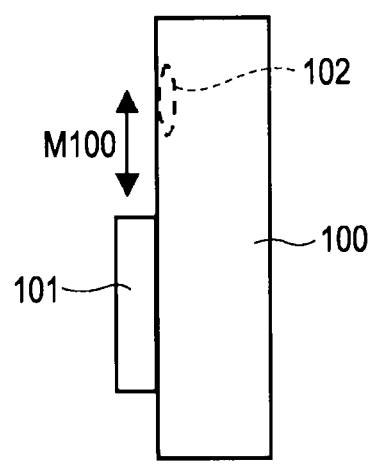
FIG. 36 is a schematic view of an existing camera including a cover that is disposed on a visible surface of a case that is substantially rectangular-parallelepiped shaped when the cover is in an open position.
Figure 37:
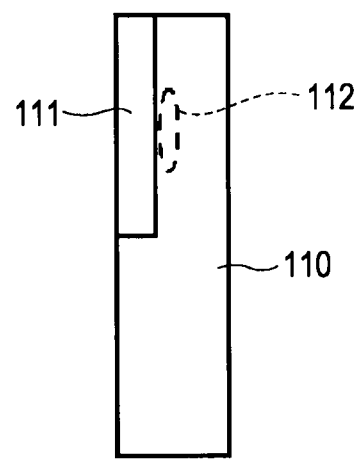
FIG. 37 is a schematic view of an existing camera including a cover that is substantially flush with the visible surface of the case in a cover closed state, illustrating a state in which the cover is in a closed position.
Figure 38:
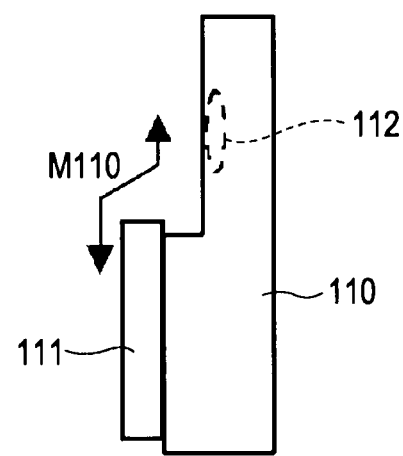
FIG. 38 is a schematic view of an existing camera including a cover that is substantially flush with the visible surface of the case in a cover closed state, illustrating a state in which the cover is in an open position.

FIGS. 31 and 32 are enlarged views of the second lever 24. FIG. 31 is an enlarged perspective view of the second lever 24, viewed from a side of the second lever 24 that faces the first and second covers 3 and 4 when the second lever 24 is assembled in the unit case 7k. FIG. 32 is an enlarged perspective view of the second lever 24, viewed from a side of the second lever 24 that faces the inner bottom surface of the unit case 7k when the second lever 24 is assembled in the unit case 7k. FIGS. 33 and 34 are enlarged views of the coil spring 25. FIG. 33 is a front view of a wound portion of the coil spring 25, and FIG. 34 is a perspective view of the coil spring 25.

As illustrated in FIG. 10, the second lever 24 is attached to the inner bottom surface of the unit case 7k so as to be rotatable around the axis of the screw 26.

As illustrated in FIGS. 10, 31, and 32, the second lever 24 includes a lever base 24a having a cylindrical shape and a lever arm 24c integrally formed on the lever base 24a, and the lever base 24a has a screw hole 24b into which the screw 26 is loosely inserted. That is, the second lever 24 is attached to the inner bottom surface of the unit case 7k so that the lever base 24a is rotatable around the axis of the screw 26. A slide contact protrusion 24d that slidingly contacts the second guide rail 3e is disposed on an end of the lever arm 24c of the second lever 24.

The coil spring 25, which is illustrated in FIGS. 33 and 34, is wound around the lever base 24a of the second lever 24. A coil 25a of the coil spring 25 is wound around the lever base 24a, a spring end 25c of the coil spring 25 is stopped by a spring stopper 24f of the second lever 24, and a spring end 25b of the coil spring 25 is stopped by a spring stopper disposed on the unit case 7k. The coil spring 25 applies a spring force to the second lever 24 in a direction around the rotation axis. That is, in the embodiment, the coil spring 25 continuously applies a spring force to the second lever 24 in a direction around the axis of the screw 26, and the lever arm 24c converts the spring force to a force in a direction in which the slide contact protrusion 24d is constantly pressed against the second guide rail 3e.

The first lever guide 3f of the second guide rail 3e has a substantially angular shape including a first inclined portion and a second inclined portion. The first inclined portion applies a force to the lever arm 24c so as to resist the spring force applied to the lever arm 24c when the first cover 3 is slid in a state in which the lever arm 24c of the second lever 24 slidingly contacts the slide contact protrusion 24d. The second inclined portion is inclined so as to cancel the force applied in the direction that resists the spring force. The first inclined portion, which applies a force to the lever arm 24c so as to resist the spring force, is disposed at a position that the slide contact protrusion 24d contacts in the cover closed state. Therefore, in the embodiment, the slide contact protrusion 24d slides along the angular shape of the first lever guide 3f when the first cover 3 is slid, whereby a spring reaction force is generated in accordance with the angular shape of the first lever guide 3f and is applied to a user's finger or the like that is sliding the first cover 3. That is, for example, when the slide contact protrusion 24d is slid so as to pass through the vertex of the angular shape, a strong reaction force is applied to a user's finger so as to resist the spring force and then the reaction force decreases, whereby the user can feel a tactile feel. When the first cover 3 is slid to a position that corresponds to the cover closed state, the lever arm 24c applies a strong reaction force to the first cover 3 so as to resist the spring force. Therefore, in the cover closed state, the first cover 3 is substantially locked at the position corresponding to the cover closed state. In other words, in the cover closed state, the first cover 3 is locked and prevented from wobbling in a sliding direction.

The second lever guide 3g of the second guide rail 3e has an inclined portion that applies a force to the lever arm 24c so as to resist a spring force applied to the lever arm 24c when the slide contact protrusion 24d of the lever arm 24c of the second lever 24 is in contact with the second lever guide 3g. The inclined portion, which applies a force to the lever arm 24c so as to resist the spring force, is disposed at a position that the slide contact protrusion 24d contacts in the cover open state. Therefore, in the embodiment, when the first cover 3 is slid to a position corresponding to the cover open state, the lever arm 24c applies a strong reaction force to the first cover 3 so as to resist the spring force, whereby the first cover 3 is substantially locked at the position corresponding to the cover open state. In other words, in the cover open state, the first cover 3 is locked and prevented from wobbling in a sliding direction.

When the first cover 3 is slid to the position corresponding to the cover open state, the slide contact protrusion 24d slides along the inclined portion of the second lever guide 3g. Therefore, the inclined portion of the second lever guide 3g produces a sensation of a change in the spring reaction force to a user's finger or the like that is sliding the first cover 3 to a position corresponding to the cover open state, whereby the user can feel a tactile feel. Moreover, due to the sliding of the slide contact protrusion 24d, sliding of the first cover 3 is not stopped at a position at which the first cover 3 covers the lens opening 5, whereby an image of the first cover 3 is prevented from being captured by the camera.

SUMMARY

As described above, when the mobile phone terminal and the cover unit of the embodiments of the present invention are in the cover closed state, the visible surfaces of the first cover 3 and the second cover 4 are at substantially the same height as (flush with) the visible surface of the case 2. When the mobile phone terminal and the cover unit of the embodiments of the present invention are in the cover closed state, the first cover 3 is disposed in a space from which the second cover 4 has been moved downward, so that the visible surface of the first cover 3 is at substantially the same height as (flush with) the visible surface of the case 2.

That is, irrespective of whether the mobile phone terminal and the cover unit of the embodiment are in the cover open state or in the cover closed state, the cover structure does not protrude from the surface of the case, whereby a flat design can be realized. The flat cover structure of the embodiment is user-friendly, and substantially prevents the mobile phone terminal from being snagged on the seam of a pocket or the like or broken.

With the mobile phone terminal and the cover unit of the embodiments of the present invention, when the first cover 3 is slid from the cover closed state to the cover open state, the second cover 4 is retracted to a space below the first cover 3 and the first cover 3 can be moved to a space from which the second cover 4 has been retracted. With the mobile phone terminal and the cover unit of the embodiments of the present invention, when the first cover 3 is slid from the cover open state to the cover closed state, the first cover 3 is moved to a position substantially corresponding to the cover closed state and the second cover 4 is moved upward so that the visible surfaces of the first and second covers 3 and 4 are at substantially the same height and there is a step in an edge portion of the second cover 4 adjacent to the first cover 3, whereby a trouble such as a collision between the first cover 3 and the second cover 4 can be avoided.

That is, the embodiment has a simple structure including the first and second covers 3 and 4, the base 22 disposed on the back sides of the first and second covers 3 and 4, and the first lever 23. This simple structure realizes a cover structure that is flat in the cover open and cover closed states and that prevents interference between the components and breakage of the cover structure when the cover is opened and closed. With the embodiment, the first cover 3 can be slid with a weak force and the sliding motion of the first cover is converted a motion of the second cover 4 in a direction perpendicular to the second cover 4, whereby a user can open and close the cover with a small force. With the embodiment, the sliding motion of the first cover 3 is converted to the perpendicular motion of the second cover 4, whereby the cover mechanism can be disposed in a minimal space without seriously affecting the size of the mobile phone terminal. With the embodiment, the first cover 3 can be slid by a distance substantially half the length of the cover unit, whereby the first cover 3 can cover and exposed a large object to be covered.

With the mobile phone terminal and the cover unit of the embodiments, the timings of the sliding motion of the first cover 3 and the perpendicular motion of the second cover 4 can be appropriately determined, whereby breakage of the first cover 3 that may be caused by a collision with the second cover 4 during sliding can be prevented, the appearance of the mobile phone terminal can be made flat and smooth, whereby a user-friendly and high-quality cover mechanism can be realized.

When the mobile phone terminal and the cover unit of the embodiments are in the cover closed state, the arm 22e and the protrusion 22f of the base 22 are in contact with the flat leg surface 7i of the leg 7g of the second cover 4. Therefore, the second cover 4 can be continuously pushed upward in a direction perpendicular to the visible surface of the second cover 4, whereby, for example, the second cover 4 is prevented from wobbling due to vibrations of a speaker or a vibrator disposed in the mobile phone terminal and due to vibration applied from the outside.

With the mobile phone terminal and the cover unit of the embodiments, the second guide rail 3e and the second lever 24 can produce a predetermined tactile feel to a user's finger or the like that is sliding the first cover 3, so that sliding of the first cover 3 is prevented from being stopped at a position at which the first cover 3 covers the object to be covered. Moreover, the cover closed state and the cover open state can be substantially maintained (locked).

Thus, with the embodiment, a mobile phone terminal and a cover unit having a new design can be provided to a user, whereby business appeal and user-friendliness can be enhanced.

With the embodiment, the cover unit includes a small number of components having simple shapes and structures, whereby the cover unit can be made of a wide range of materials and easily assembled at low cost. For the same reason, with the embodiment, the time interval and man hours for design can be reduced, whereby the cost can be reduced. Because the number of components is small and the components have simple shapes and structures, man-hours for manufacturing, checking, and evaluation can be reduced, and the quality of products and the quality of assembling can be made uniform.

With the embodiment, the size of the cover unit can be reduced, so that the cover unit can be installed in a small space when, for example, the cover unit is used in a mobile phone terminal. Therefore, spaces for other components, such as a camera and the like, can be increased, whereby an advanced multifunctional and low-profile mobile terminal can be provided.

The mobile phone terminal 1 of the embodiment is waterproof, and the camera lens and the flash light are waterproof-sealed. The cover unit of the embodiment can be opened and closed without affecting the waterproof function. Therefore, with the embodiment, water does not enter the mobile phone terminal 1 irrespective of whether the mobile phone terminal 1 is in the cover open state or in the cover closed state.

The embodiment described above is an example of the present invention. The present invention is not limited to the embodiment, and can be modified in various ways in accordance with the design or the like within the technical scope of the present invention.

In the embodiment described above, the cover unit is mounted on the mobile phone terminal. However, the present invention is applicable to a wide range of apparatus, such as a digital camera, in which a cover mechanism for covering an object to be covered is used. The cover unit may not be a part of a mobile phone terminal, and may be an independent module that is assembled in a mobile phone terminal.

In the embodiment described above, the leg 7c1 to 7c6 are disposed on the back side of the second cover 4 and the holes 22c1 to 22c4 are formed in the base 22. However, for example, legs may be disposed on the base, and holes having a depth that allows the legs to be inserted therethrough may be formed in the back side of the second cover 4. In this case, the base is slidingly moved by rotating the first lever 23 in accordance with the sliding motion of the first cover 3, so that the legs of the base are loosely inserted into the hole formed in the second cover 4 or by making the legs contact the back surface of the second cover 4, whereby the second cover 4 is moved in a direction perpendicular to the visible surface thereof as described above. Also in this case, the legs have inclined surfaces, and the holes have inclined surfaces.

The number of the legs 7c1 to 7c6 and the number of the holes 22c1 to 22c4 are not limited to the aforementioned numbers, and may be larger than or smaller than the aforementioned numbers.

In the embodiment described above, in the cover closed state, the first cover 3 and the second cover 4 are arranged along a short axis of the mobile phone terminal. However, in the cover closed state, the first and second covers may be arranged along a long axis of the mobile phone terminal.

It should be understood by those skilled in the art that various modifications, combinations, sub-combinations and alterations may occur depending on design requirements and other factors insofar as they are within the scope of the appended claims or the equivalents thereof.

What is claimed is:

1. A cover unit comprising:
a first cover that is slidably movable in a first direction between a cover position at which the first cover covers an object to be covered and an exposed position at which the first cover does not cover the object to be covered;
a second cover including a visible surface that is substantially coplanar with a visible surface of the first cover when the first cover is in the closed position, the second cover being movable in a height direction, said height direction being substantially perpendicular to the visible surface of the second cover, said second cover including a leg that is disposed on a back surface of the second cover, the back surface being an opposite surface to the visible surface of the second cover; and
a cover moving mechanism that moves the second cover in the height direction in accordance with a substantially lateral movement of the first cover between the cover position and the exposed position, said first cover covering the second cover when the first cover is in the exposed position, the cover moving mechanism including
a guide that supports the first cover so that the first cover is slidably movable between the cover position and the exposed position,
a base with a hole into which the leg is inserted to accommodate a change in height of the second cover, said base also having a substantially flat portion that supports a foot of the leg when the first cover is in the covered position, wherein
when the first cover is in the cover position, the foot of the leg contacts the substantially flat portion of the base and the visible surface of the second cover is substantially coplanar with the visible surface of the first cover, and
when the first cover is moved to the exposed position, the leg is inserted into the hole and the second cover is lowered in the height direction by at least a distance that corresponds with a thickness of the first cover, wherein the object to be covered is a camera lens.

2. The cover unit according to claim 1, wherein:

the base is movable, and the cover moving mechanism further includes
a base lever that moves the base in accordance with a motion of the first cover, wherein,
when the first cover is in the cover position, the base lever positions the substantially flat portion of the base to contact the foot of the leg,
when the first cover is moved from the cover position to the exposed position, the base lever moves the base so the leg is inserted into the hole, and
when the first cover is moved from the exposed position to the cover position, the base lever moves the base so the foot of the leg contacts the substantially flat portion of the base.

3. The cover unit according to claim 2,
wherein the leg has an inclined portion and an edge of the hole has a mating inclined portion that faces the inclined portion of the leg, and
when the first cover is moved from the cover position to the exposed position and when the first cover is moved from the exposed position to the cover position, the inclined portion of the leg slidingly contacts the inclined portion of the edge of the hole in accordance with the motion of the first cover.

4. The cover unit according to claim 2,
wherein the base lever includes
a rotation axis,
a cylinder portion that is coaxial with the rotation axis,
a boss that is connected to a cylindrical surface of the cylinder, the boss converting a linear motion of the first cover to a rotational motion of the rotation axis, and
a lever arm that is connected to the cylindrical surface of the cylinder, the lever arm transferring the rotational motion of the rotation axis to the base, and
wherein the base includes
a motion converter that converts the rotational motion transferred by the lever arm to a linear motion of the base.

5. The cover unit according to claim 4,
wherein the first cover includes a guide rail that transfers the linear motion to the boss of the base lever by slidingly contacting the boss of the base lever when the first cover moves.

6. The cover unit according to claim 2,
wherein the cover moving mechanism further includes a second cover supporting portion that supports the second cover from a back surface side.

7. The cover unit according to claim 6,
wherein the second cover supporting portion includes
a supporting flat portion disposed on the back surface of the second cover, the back surface being opposite to the visible surface of the second cover,
a supporting leg disposed on the back surface of the second cover,
a supporting leg hole formed in the base, into which the supporting leg can be movably inserted, and
a supporting arm disposed on the base, the supporting arm having an end disposed in the supporting leg hole,
wherein, when the first cover is at the cover position, the end of the supporting arm supports the second cover from the back surface side by contacting an end of the supporting leg, and wherein, when the first cover is at the exposed position, the supporting leg is inserted into the supporting leg hole and the end of the supporting arm supports the second cover from the back surface side by contacting the supporting flat portion.

8. The cover unit according to claim 1,
wherein the first cover includes a depression guide that depresses an edge of the second cover adjacent to the first cover to a position below the first cover when the first cover moves from the cover position to the exposed position.

9. The cover unit according to claim 1, further comprising:
a cover lever including
a rotation axis,
a cylinder portion that is coaxial with the rotation axis,
a spring that applies a force to the cylinder portion in a direction around the rotation axis, and
an arm that is connected the cylindrical surface of the cylinder,
wherein the first cover includes a force-conversion rail that converts the force applied by the spring to a force that urges or resists a motion of the first cover by slidingly contacting the arm of the cover lever when the first cover moves between the cover position and the exposed position.

10. The cover unit according to claim 9,
wherein the force-conversion rail of the first cover includes a stopper that maintains the first cover in a stationary state by contacting the arm of the cover lever when the first cover moves between the cover position and the exposed position.

11. A mobile electronics device comprising:
a portion to be covered;
a cover unit including
a first cover that is slidably movable in a first direction between a cover position at which the first cover covers an object to be covered and an exposed position at which the first cover does not cover the object to be covered;
a second cover including a visible surface that is substantially coplanar with a visible surface of the first cover when the first cover is in the closed position, the second cover being movable in a height direction, said height direction being substantially perpendicular to the visible surface of the second cover, said second cover including a leg that is disposed on a back surface of the second cover, the back surface being an opposite surface to the visible surface of the second cover; and
a cover moving mechanism that moves the second cover in the height direction in accordance with a substantially lateral movement of the first cover between the cover position and the exposed position, said first cover covering the second cover when the first cover is in the exposed position, the cover moving mechanism including
a guide that supports the first cover so that the first cover is slidably movable between the cover position and the exposed position,
a base with a hole into which the leg is inserted to accommodate a change in height of the second cover, said base also having a substantially flat portion that supports a foot of the leg when the first cover is in the covered position, wherein
when the first cover is in the cover position, the foot of the leg contacts the substantially flat portion of the base and the visible surface of the second cover is substantially coplanar with the visible surface of the first cover, and when the first cover is moved to the exposed position, the leg is inserted into the hole and the second cover is lowered in the height direction by at least a distance that corresponds with a thickness of the first cover; and a case that contains the portion to be covered and the cover unit, the case having a visible surface that is substantially flush with the visible surface of the first cover, wherein the object to be covered is a camera lens.

12. The mobile electronics device according to claim 11, the base is movable, and the cover moving mechanism further includes a base lever that moves the base in accordance with a motion of the first cover, wherein, when the first cover is in the cover position, the base lever positions the substantially flat portion of the base to contact the foot of the leg, when the first cover is moved from the cover position to the exposed position, the base lever moves the base so the leg is inserted into the hole, and when the first cover is moved from the exposed position to the cover position, the base lever moves the base so the foot of the leg contacts the substantially flat portion of the base.

13. The mobile electronics device according to claim 12, wherein the leg has an inclined portion and an edge of the hole has a mating inclined portion that faces the inclined portion of the leg, and when the first cover is moved from the cover position to the exposed position and when the first cover is moved from the exposed position to the cover position, the inclined portion of the leg slidingly contacts the inclined portion of the edge of the hole in accordance with the motion of the first cover.

14. The mobile electronics device according to claim 12, wherein the base lever of the cover unit includes a rotation axis, a cylinder portion that is coaxial with the rotation axis, a boss that is connected to a cylindrical surface of the cylinder, the boss converting a linear motion of the first cover to a rotational motion of the rotation axis, and a lever arm that is connected to the cylindrical surface of the cylinder, the lever arm transferring the rotational motion of the rotation axis to the base, and wherein the base of the cover unit includes a motion converter that converts the rotational motion transferred by the lever arm to a linear motion of the base.

15. The mobile electronics device according to claim 14, wherein the first cover of the cover unit includes a guide rail that transfers the linear motion to the boss of the base lever by slidingly contacting the boss of the base lever when the first cover moves.

16. The mobile electronics device according to claim 12, wherein the cover moving mechanism of the cover unit further includes a second cover supporting portion that supports the second cover from a back surface side.

17. The mobile electronics device according to claim 16, wherein the second cover supporting portion of the cover unit includes a supporting flat portion disposed on the back surface of the second cover, the back surface being opposite to the visible surface of the second cover, a supporting leg disposed on the back surface of the second cover, a supporting leg hole formed in the base, into which the supporting leg can be movably inserted, and a supporting arm disposed on the base, the supporting arm having an end disposed in the supporting leg hole, wherein, when the first cover is at the cover position, the end of the supporting arm supports the second cover from the back surface side by contacting an end of the supporting leg, and wherein, when the first cover is at the exposed position, the supporting leg is inserted into the supporting leg hole and the end of the supporting arm supports the second cover from the back surface side by contacting the supporting flat portion.

18. The mobile electronics device according to claim 11, wherein the first cover of the cover unit includes a depression guide that depresses an edge of the second cover adjacent to the first cover to a position below the first cover when the first cover moves from the cover position to the exposed position.

19. The mobile electronics device according to claim 11, wherein the cover unit further includes a cover lever including a rotation axis, a cylinder portion that is coaxial with the rotation axis, a spring that applies a force to the cylinder portion in a direction around the rotation axis, and an arm that is connected the cylindrical surface of the cylinder, wherein the first cover of the cover unit includes a force-conversion rail that converts the force applied by the spring to a force that urges or resists a motion of the first cover by slidingly contacting the arm of the cover lever when the first cover moves between the cover position and the exposed position.

20. The mobile electronics device according to claim 19, wherein the force-conversion rail of the first cover of the cover unit includes a stopper that maintains the first cover in a stationary state by contacting the arm of the cover lever when the first cover moves between the cover position and the exposed position.

21. A mobile electronics device comprising:

a portion to be covered;

a cover unit including a first cover that is slidably movable in a first direction between a cover position at which the first cover covers an object to be covered and an exposed position at which the first cover does not cover the object to be covered;

a second cover including a visible surface that is substantially coplanar with a visible surface of the first cover when the first cover is in the closed position, the second cover being movable in a height direction, said height direction being substantially perpendicular to the visible surface of the second cover, and means for moving the second cover in the height direction in accordance with a substantially lateral motion of the first cover between the cover position and the exposed position, said first cover covering the second cover when the first cover is in the exposed position, the means for moving including means for lowering said second cover into a cavity covered by said first cover in response to said first cover being moved to the exposed position, and means for maintaining a fixed overall height of said mobile communication terminal when said first cover is in said cover position and when said first cover is in said exposed position; and a case that contains the portion to be covered and the cover unit, the case having a visible surface that is substantially flush with the visible surface of the first cover, wherein the object to be covered is a camera lens.

* * * * *